United States Patent
Kobayashi

[19]

[11] Patent Number: 5,906,557
[45] Date of Patent: May 25, 1999

[54] MANUAL TRANSMISSION FOR FOUR WHEEL DRIVE VEHICLE

[75] Inventor: Toshio Kobayashi, Tokyo, Japan

[73] Assignee: Fuji Jukogyo Kabushiki Kaisha, Tokyo, Japan

[21] Appl. No.: 08/969,446

[22] Filed: Nov. 13, 1997

[30] Foreign Application Priority Data

Dec. 13, 1996 [JP] Japan ................................. 8-333894

[51] Int. Cl.⁶ .............................................. F16H 3/085
[52] U.S. Cl. ............................ 475/199; 475/206; 180/249
[58] Field of Search .................................. 475/198, 199, 475/206; 180/248, 249, 250

[56] References Cited

U.S. PATENT DOCUMENTS

| | | | |
|---|---|---|---|
| 4,318,305 | 3/1982 | Wetrich et al. | 475/198 |
| 4,499,791 | 2/1985 | Brisabois | 475/198 |
| 4,601,217 | 7/1986 | Teroka et al. | 180/250 |
| 4,727,954 | 3/1988 | Matsumoto | 180/249 |
| 4,744,437 | 5/1988 | Matsumoto | 180/249 |
| 4,907,472 | 3/1990 | Mura | 475/206 |
| 5,149,307 | 9/1992 | Malloy et al. | 475/206 |
| 5,704,866 | 1/1998 | Pritchard et al. | 475/206 |
| 5,762,578 | 6/1998 | Forsyth | 475/198 |

Primary Examiner—Dirk Wright
Attorney, Agent, or Firm—Smith, Gambrell & Russell; Beveridge, DeGrandi, Weilacher & Young Intellectual Property Group

[57] ABSTRACT

A manual transmission for a four wheel drive vehicle having a driving force distributing apparatus is composed of a transmission gearing mechanism and a differential mechanism. The transmission gearing mechanism comprises an input shaft for transmitting driving force of an engine, an output shaft arranged on the same axis as the input shaft for outputting driving force of the transmission to the differential mechanism, a counter shaft arranged in parallel with the output shaft for transmitting driving force from the input shaft to the output shaft through transmission gears. The differential mechanism mounted at the rear end of the transmission mechanism on the same axis as the output shaft comprises a differential for distributing driving force of the transmission gearing mechanism into a front drive shaft and a rear drive shaft. Further, the differential mechanism includes a differential limiting mechanism for controlling a torque distribution ratio according to running conditions. The feature of this manual transmission is that the differential mechanism can be mounted in a relatively high position, therefore a pumping-up of lubrication oil in the differential mechanism can be avoided and as a result a stirring resistance of oil can be reduced, thereby fuel economy and oil deterioration are improved.

62 Claims, 18 Drawing Sheets

MANUAL TRANSMISSION FOR FOUR WHEEL DRIVE VEHICLE

BACKGROUND OF THE INVENTION

1. Field of the Invention

The present invention relates to a manual transmission for a four wheel drive vehicle and, in particular, to a manual transmission having a small agitation resistance of lubrication oil and having a differential mechanism which can vary a torque distribution ratio between input output elements according to running conditions.

2. Description of Prior Arts

Generally, the manual transmission used for a four wheel drive vehicle is constituted by a manual transmission gearing mechanism for changing speeds and a driving force distributing mechanism for distributing driving force into front and rear wheels. For example, Published Japanese Patent Application No. Toku-Kou-Hei 4-55892 discloses a transmission technique as shown in FIG. 25, in which numeral 201 denotes an input shaft rotatably mounted on a transmission case 202 for transmitting driving force of an engine to the transmission through a clutch. Numeral 203 denotes a front drive shaft arranged in parallel with the input shaft 201 and rotatably supported by the transmission case 202.

The front drive shaft 203 is rotatably fitted to a hollow-shaped shaft 205 which is driven by the input shaft 201 through a manual transmission gearing mechanism 204. The hollow-shaped shaft 205 is divided into an input side shaft 205a and an output side shaft 205b through a sleeve 206 and it is connected at the output end thereof with a driving force distributing apparatus 207.

The driving force distributing apparatus 207 comprises a pinion shaft 208 fixed to the output end of the hollow shaft 205, a pinion 209 rotatably supported by the pinion shaft 208, and side gears 210a and 210b meshing with the pinion 209. On the other hand, the side gear 210a is spline-fitted to a collar 211 which is connected with a rear end of the front drive shaft 203.

On the other hand, the side gear 210b is integrally formed with a differential case 212 for accommodating the pinion shaft 208, the pinion 209 and side gears 210a, 210b. The differential case 212 is rotatably supported at both ends thereof by the an extension case (not shown).

Further, the differential case 212 has a drive gear 213 through which driving force is transmitted to a rear drive shaft (not shown).

Further, the driving force inputted from the engine to the input side shaft 205a of the hollow shaft 205 through the input shaft 201 and the manual transmission gearing mechanism 204 is transmitted to the pinion shaft 208 through the sleeve 206 and the output side shaft 205b. The driving force is divided into two, one is transmitted to the front drive shaft 203 through the pinion 209, the side gear 210a and the other is transmitted to the rear drive shaft (not shown) through the pinion 209, the differential case 212 and the drive gear 213. Thus, the driving force transmitted to the front drive shaft 203 drives front wheels and the one transmitted to the rear drive shaft drive rear wheels. When a rotational difference is generated between the front and rear drive shafts, a rotational difference occurs between the side gear 210a on the front drive shaft 203 side and the side gear 210b on the rear drive shaft side and as a result the rotational difference is absorbed by the rotation of the pinion 209.

Since the transmission according to this prior art is constituted such that the driving force of the engine is transmitted directly to the rear drive shaft side through the pinion shaft, the pinion and the side gear, it is not necessary to provide an additional intermediate shaft for transmitting driving force from the side gear to the rear drive shaft and resultantly the compact transfer case can be realized. Further, since the rear drive gear is provided coaxially with the front drive shaft through the hollow shaft, the rear drive shaft can be arranged above the front drive shaft, therefore it becomes easier to obtain a large road clearance in consideration of facilitating an off-road running.

Further, the transmission according to this prior art has an advantage of being able to lubricate the front differential, the manual transmission gearing mechanism, the driving force distributing apparatus with a single lubrication oil because these main components are arranged almost at the same level. However, since it is generally needed that the static oil level comes at least near the rotating axis of the hypoid gear of the front differential, most parts of the driven gears of the manual transmission gearing mechanism and the driving force distributing apparatus dip in the lubrication oil.

When the vehicle is operated in this state, the hypoid gear having a relatively large diameter and the driving force distributing apparatus disposed behind the hypoid gear pump up the lubrication oil. This "pumping-up" phenomenon becomes greater with an increase of the vehicle speed. In high speeds, most lubrication oil is attracted to the hypoid gear and the driving force distributing apparatus. As a result of this, the oil level around the manual transmission gearing mechanism becomes low, leading to insufficient lubrication. Generally, to solve this problem, the static level of lubrication oil must be raised to a higher level.

Thus, the "pumping-up" phenomenon brings about a great amount of lubrication oil and as a result power transmission efficiency and fuel economy are exacerbated due to an increase of agitation resistance of oil. The magnitude of this exacerbation becomes large as the vehicle speed becomes high. Further, when the vehicle is accelerated or runs on a grade, the lubrication oil moves towards the driving force distributing apparatus and causes an increase of agitation resistance of oil, this also leading to an adverse effect on fuel economy.

Further, this increase of stirring resistance brings about an increase of oil temperature leading to deterioration of oil. The deterioration of oil incurs wearing or damages of the manual transmission mechanism in gears, damages of the synchromesh mechanism and the driving force distributing apparatus or damages of oil seals in lip surfaces.

Further, since the driving force distributing apparatus is mounted at the rear end of the front drive shaft, that is, at the rear end of the transmission, the driving force distributing apparatus is formed being projected and further this projection restricts a freedom in installing members for supporting the transmission or establishing spaces for accommodating a transmission control system or an exhaust system. This results in making interchangeability between a manual transmission and an automatic transmission more difficult.

SUMMARY OF THE INVENTION

It is therefore an object of the present invention to provide a manual transmission for a four wheel drive vehicle having a very low agitation resistance of lubrication oil. It is a further object of the present invention to provide a manual transmission for four wheel drive vehicle capable of preventing tight cornering brake phenomena when the vehicle makes a turn. Further, it is another object of the present invention to provide a manual transmission for a four wheel drive vehicle capable of facilitating interchangeability between a manual transmission and an automatic transmission.

In order to achieve these objects, the manual transmission for a four wheel drive vehicle according to the present invention comprises:

an input shaft for inputting driving force of the engine;

an input drive gear connected with the input shaft;

a hollow-shaped counter shaft arranged in parallel with the input shaft;

a counter driven gear connected with the counter shaft and meshing with the output drive gear;

a plurality of transmission drive gears connected with the counter shaft;

an output shaft arranged in parallel with the counter shaft on the same axis as the input shaft for outputting driving force of the transmission;

a plurality of transmission driven gears rotatably mounted on the output shaft and meshing with the corresponding transmission drive gears;

a plurality of synchronizing mechanisms spline-fitted to the output shaft for selectively engaging the transmission driven gears with the output shaft; and a driving force distributing means provided on the same axis as the output shaft for inputting driving force of the manual transmission and for distributing driving force of the manual transmission into a first drive shaft connected with a front wheel and a second drive shaft connected with a rear wheel.

Further, the driving force distributing means according to the present invention comprises a differential mechanism including a transfer drive gear rotatably mounted on the output shaft, a transfer driven gear connected with said first drive shaft and meshing with the transfer drive gear, a first sun gear connected with the output shaft, a second sun gear rotatably arranged on the same axis as the output shaft and connected with the second drive shaft, a carrier connected with the transfer drive gear, a first pinion rotatably mounted on the carrier and meshing with the first sun gear, a second pinion integrally formed with the first pinion and meshing with the second sun gear for distributing driving force into the first drive shaft and the second drive shaft at a specified torque distribution ratio, and a differential limiting mechanism connecting the carrier and the second drive shaft for varying the specified torque distribution ratio.

Further, the differential limiting mechanism has a capability of varying the specified torque distribution ratio according to running conditions such as a slip rate and a steering angle so as to change a torque distribution ratio between front and rear wheels.

DETAILED DESCRIPTION OF THE INVENTION

Figure 1A:
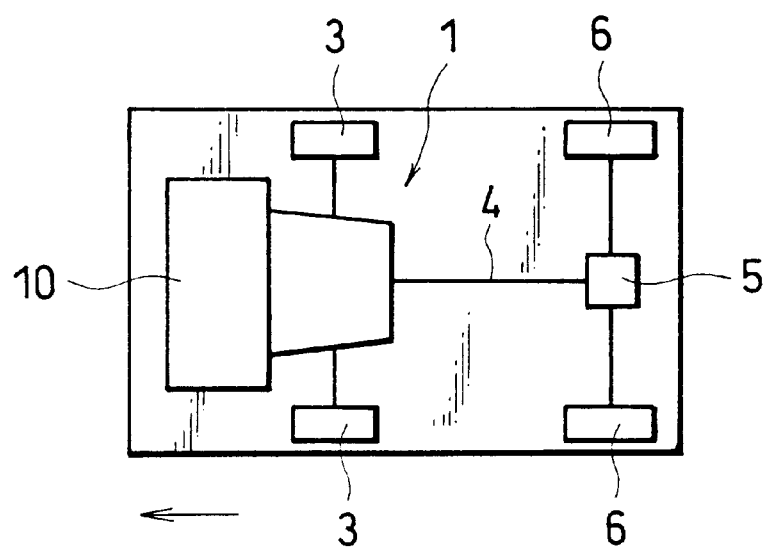
FIG. 1a is a schematic view showing an arrangement of a power train of a four wheel drive vehicle whose engine and manual transmission are mounted on the front side of the vehicle.
Figure 1B:
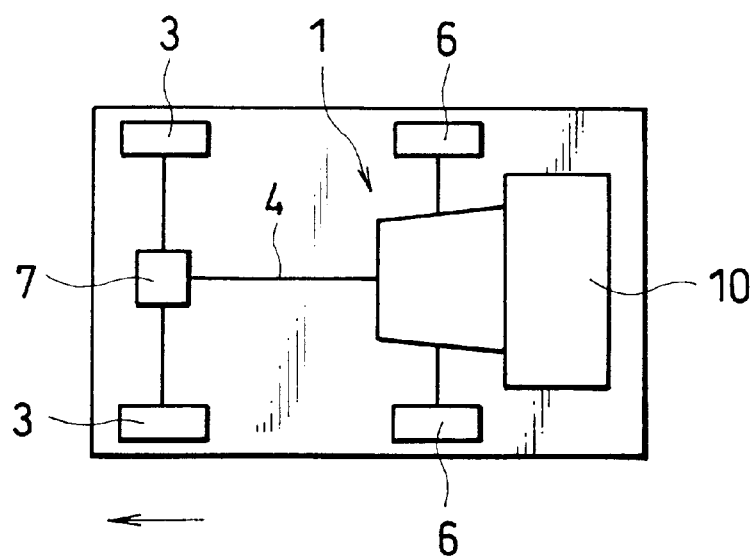
FIG. 1b is a schematic view showing an arrangement of a power train of a four wheel drive vehicle whose engine and manual transmission are mounted on the rear side of the vehicle.

As shown in FIG. 1a, a manual transmission 1 for a four wheel drive vehicle is integrally connected with an engine 10 mounted longitudinally on the vehicle so as to transmit driving force to a front wheel 3 and also to a rear wheel 6 through a propeller shaft 4 and a rear differential 5. On the other hand, in case of an engine 10 mounted longitudinally on the rear side of the vehicle, as shown in FIG. 1b, driving force is transmitted to a rear wheel 6 and at the same time to a front wheel 3 through a propeller shaft 4 and a front differential 7.

In this embodiment, the former case, a case where the engine 10 is arranged on the front side of the vehicle together with the transmission 1 will be described.

Figure 2:
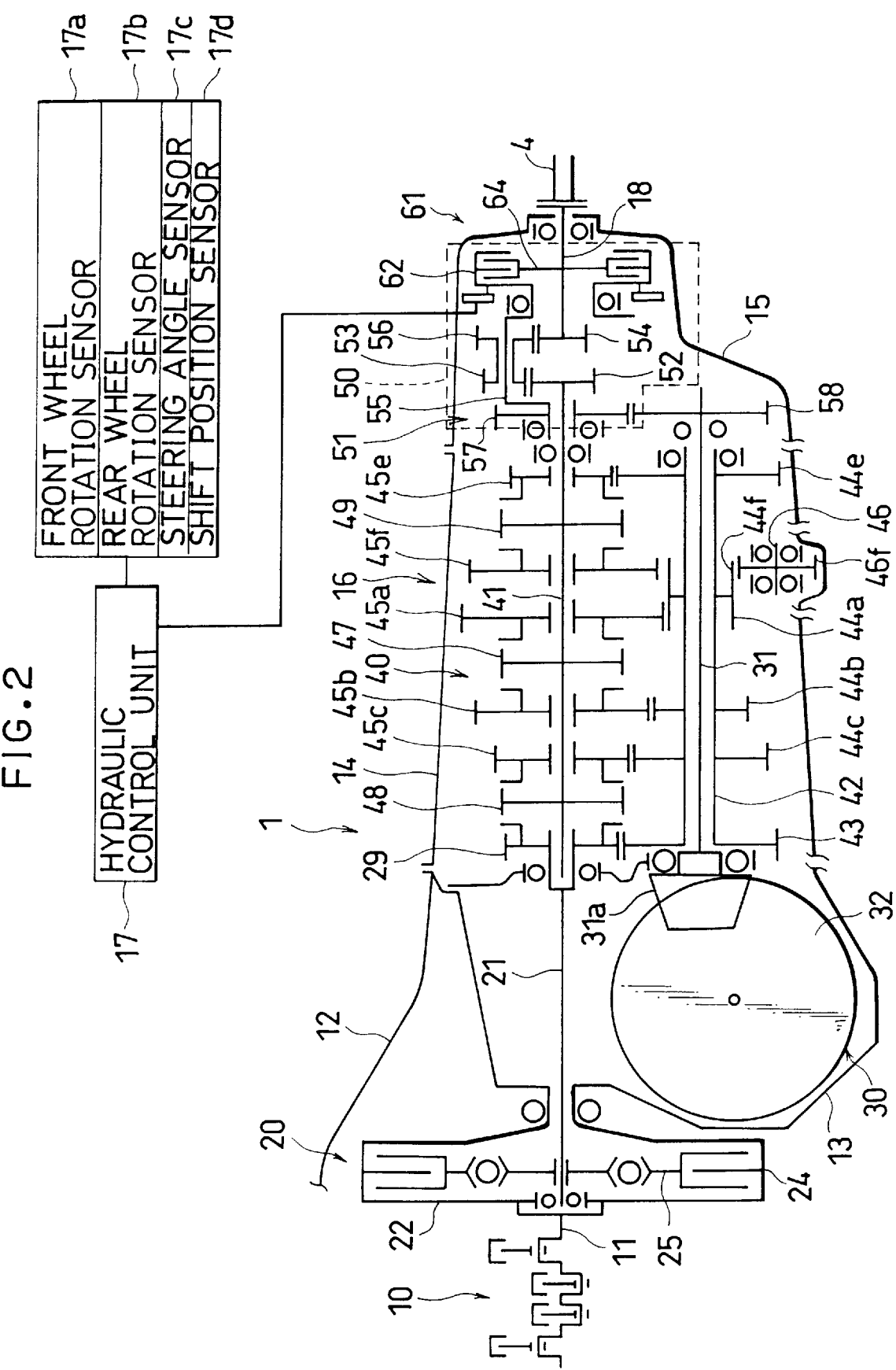
FIG. 2 is a schematic drawing showing a manual transmission according to a first embodiment of the present invention.

Referring to FIG. 2, numeral 10 denotes a longitudinally mounted engine and a clutch 20 is connected with the engine 10. Numeral 12 denotes a clutch housing for accommodating the clutch 20 and numeral 13 denotes a differential housing for accommodating a front differential 30. Further, a main case 14 for accommodating a manual transmission gearing mechanism 40 is connected with the rear end of the differential housing 13 and an extension case 15 for accommodating a driving force distributing apparatus 50 is connected with the rear end of the main case 14. In this embodiment or other embodiments which will be described hereinafter, numeral 16 denotes a transmission case including all of these components, clutch housing 12, differential housing 13, main case 14 and extension case 15 in this order.

The driving force is transmitted from a crank shaft 11 of the engine 10 to an output shaft 41 and a counter shaft 42 of the transmission gearing mechanism 40 through the clutch 20 and an input shaft 21.

Further, the driving force shifted in the transmission gearing mechanism 40 is outputted to the output shaft 41 and then the driving force is inputted from the output shaft 41 to the driving force distributing apparatus 50. Further, the driving force is distributed from the driving force distributing apparatus 50 partly to the front wheel 3 through the front differential 30 and partly to the rear wheel 6 through the propeller shaft 3 and the rear differential 5.

In the transmission case 16, there is provided with a hydraulic pump (not shown) to produce hydraulic pressure. Hydraulic pressure is used for controlling the driving force distributing apparatus 50 through a hydraulic control unit 17 based on signals from a front wheel rotation sensor 17a, a rear wheel rotation sensor 17b, a steering angle sensor 17c, a shift position switch 17d and the like.

Figure 3:
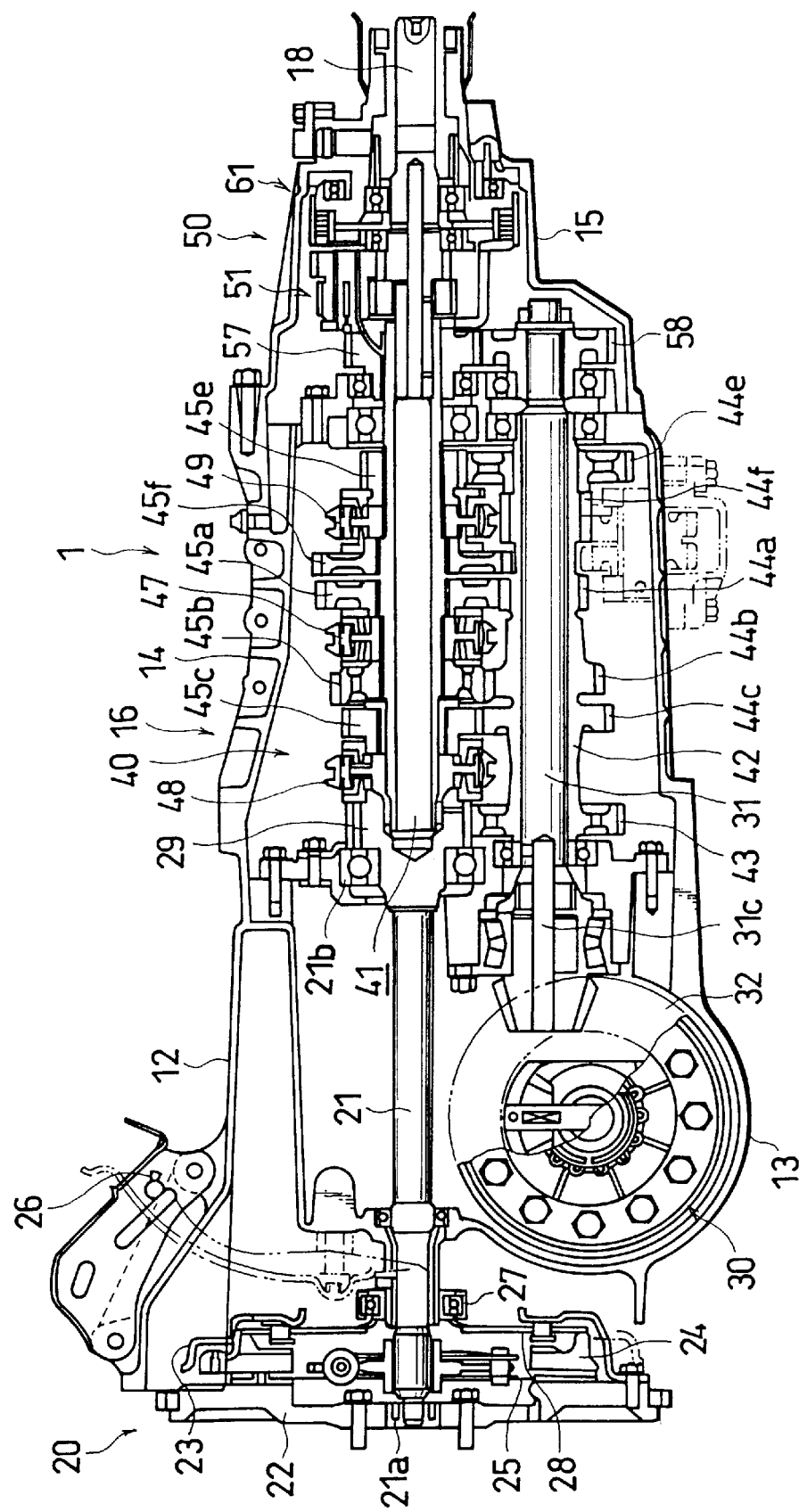
FIG. 3 is a cross sectional view showing a manual transmission according to a first embodiment of the present invention.

Describing the clutch 20 in detail with reference to FIG. 3, it comprises a flywheel 22 integrally connected with the crank shaft 11 of the engine 10, a clutch cover 23 integrally connected with the flywheel 22, a pressure plate 24 connected with the clutch cover 23 and movable along the input shaft 21, a clutch disc 25 slidaly spline-fitted to the input shaft 21 so as to transmit torque from the crank shaft 11 to the input shaft 21 by means of a friction force generated by pressing the clutch disc 25 on the flywheel 22 with the spring force of the pressure plate 24.

When the clutch 20 disengaged, a release fork 26 pushes a release bearing 27 inwardly, thereby the pressure plate 24 is detached from the flywheel 22 through a release lever 28.

The input shaft 21 is rotatably supported at the front end thereof by the flywheel 22 through a pilot bearing 21a and at the rear end thereof by the main case 14 through a bearing 21b. The driving force is transmitted from the input shaft 21 to the transmission gearing mechanism 40 by the engagement between an input drive gear 29 connected with the rear end of the input shaft 21 and a counter driven gear 43 provided at the front end of the counter shaft 42.

Figure 4:
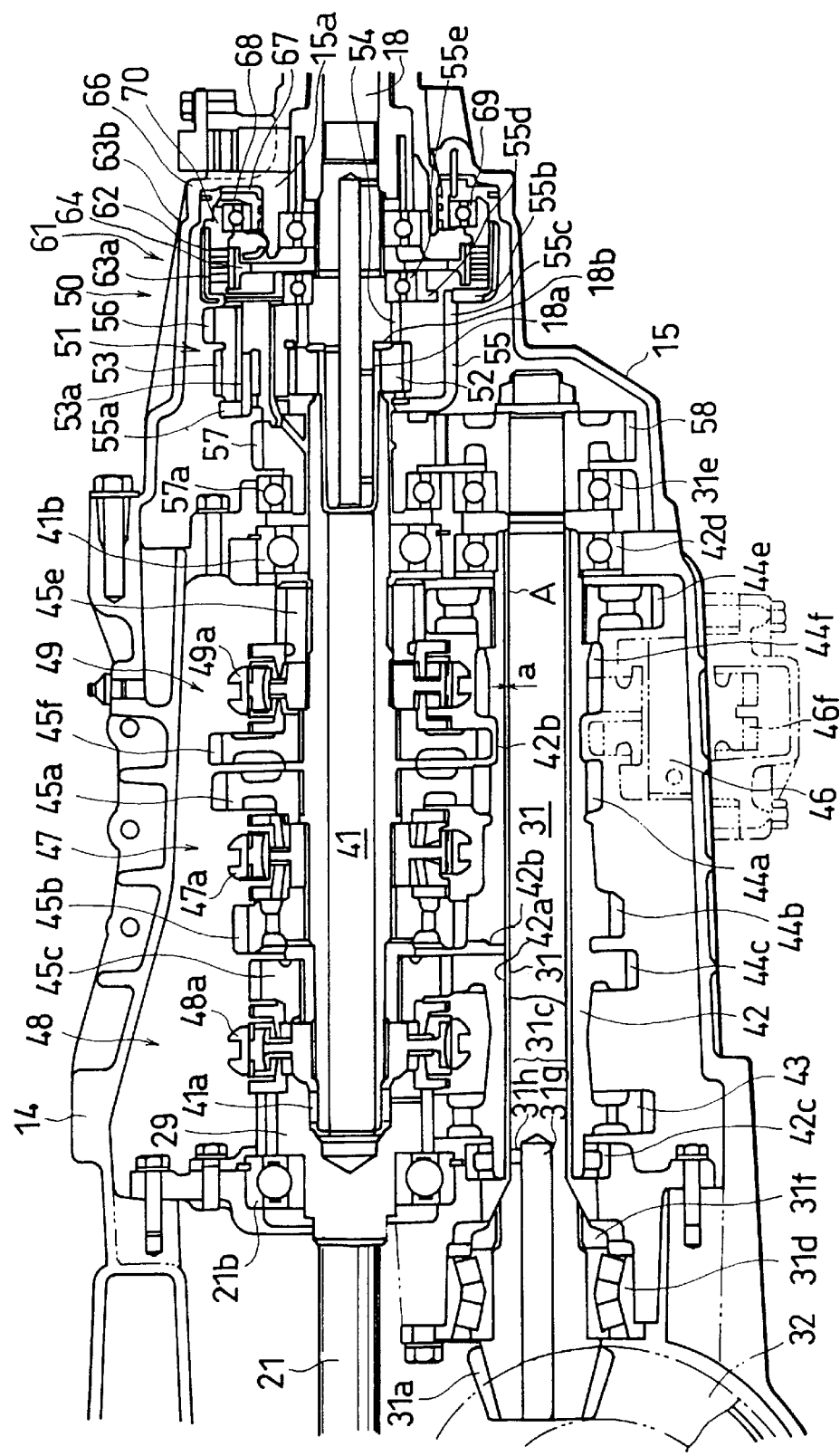
FIG. 4 is a partially enlarged view of FIG. 3.

Next, describing the transmission gearing mechanism 40 with reference to FIG. 4, the output shaft 41 is rotatably and coaxially supported at the front end thereof by the rear end of the input shaft 21 through a bushing 41a and further rotatably supported at the rear end thereof by the main case 14 through a bearing 41b. On the other hand, the counter shaft 42 is provided under the output shaft 41 in parallel and is rotatably supported at the front and rear ends thereof by bearings 42c and 42d respectively. Further, the counter shaft 42 is hollowed through around the axis thereof.

On the counter shaft 42, a 3rd drive gear 44c, a 2nd drive gear 44b, a 1st drive gear 44a and a reverse drive gear 44f are integrally formed in this order in the rear direction. Further, a 5th drive gear 44e is spline-fitted between the reverse drive gear 44f and the bearing 42d on the counter shaft 42. Further, an oil hole 42b is provided around an inner periphery 42a of the counter shaft 42.

On the other hand, a 3rd driven gear 45c, a 2nd driven gear 45b, a 1st driven gear 45a and a 5th driven gear 45e are rotatably coupled with the output shaft 41 through needle bearings constantly in mesh with the 3rd drive gear 44c, the 2nd drive gear 44b, the 1st drive gear 44a and the 5th drive gear 44e, respectively. Further, a reverse driven gear 45f is rotatably coupled with the output shaft 41 through a needle bearing between the 1st driven gear 45a and the 5th driven gear 45e.

The pitch circle diameters of gears provided in the counter shaft 42 are formed so as to become large in the order of the 1st drive gear 44a, the 2nd drive gear 44b, the 3rd drive gear 44c and the 5th drive gear 44e and the pitch circle diameters of gears provided in the output shaft 41 are formed so as to become small in the order of the 1st driven gear 45a, the 2nd driven gear 45b, the 3rd driven gear 45c and the 5th driven gear 45e.

The reverse drive gear 44f meshes with a reverse idler gear 46f rotatably connected with an idler shaft 46 which is disposed between the bearing and the wall of the main case 14 and then the reverse idler gear 46f meshes with the reverse driven gear 45f provided on the output shaft 41 so as to rotate in the same direction as the reverse driven gear 45f.

A first synchronizer 47 is rotatably connected with the output shaft 41 in order to interlock the 1st driven gear 45a and the 2nd driven gear 45b with the output shaft 41 selectively.

When a selector is operated to move a sleeve 47a of the first synchronizer 47 from a neutral position to backward, the 1st driven gear 45a is synchronized with the rotational speed of the output shaft 41. Thus, the driving force of the input shaft 21 inputted to the counter shaft 42 through the input drive gear 29 and the counter driven gear 43 is transmitted to the output shaft 41 at a reduced speed corresponding to a 1st speed ratio determined from the gear ratio of the 1st drive gear 44a and the 1st driven gear 45a. When the selector is operated to return the sleeve 47a to the neutral position, the engagement of the 1st driven gear 45a with the output shaft 41 is released. On the other hand, when the sleeve 47a is moved forward, the 2nd driven gear 45b is synchronized with the output shaft 41 through an engagement of both and a 2nd speed ratio determined from the gear ratio of the 2nd drive gear 44b and the 2nd driven gear 45b is obtained.

Further, a second synchronizer 48 for the 3rd and 4th speeds is provided between the input drive gear 29 and the 3rd driven gear 45c. When a sleeve 48a of the second synchronizer 48 is moved backward, the 3rd driven gear 45c is synchronized with the rotational speed of the output shaft 41 through the second synchronizer 48. Thus, the driving force of the input shaft 21 inputted to the counter shaft 42 through the input drive gear 29 and the counter driven gear 43 is transmitted to the output shaft 41 at a speed corresponding to a 3rd speed ratio determined from the gear ratio of the 3rd drive gear 44c and the 3rd driven gear 45c. When the selector is operated to return the sleeve 48a of the second synchronizer 48 to a neutral position, the engagement of the 3rd driven gear 45c with the output shaft 41 is released. On the other hand, when the sleeve 48a of the second synchronizer 48 is moved forward, the second synchronizer 48 engages the input shaft 21 with the output shaft directly and a 4th speed is obtained.

Further, there is provided with a third synchronizer 49 between the reverse driven gear 45f and the 5th driven gear 45e. When a sleeve 49a of the third synchronizer 49 is moved backward, the 5th driven gear 45e is synchronized with the rotational speed of the output shaft 41 through the third synchronizer 49. Thus, the driving force of the input shaft 21 inputted to the counter shaft 42 through the input drive gear 29 and the counter driven gear 43 is transmitted to the output shaft 41 at a speed corresponding to a 5th speed ratio determined from the gear ratio of the 5th drive gear 44e and the 5th driven gear 45e. On the other hand, when the sleeve 49a is moved forward, the reverse driven gear 45f is synchronized with the rotational speed of the output shaft 41 through the third synchronizer 49 and the output shaft 41 is rotated in reverse by the counter shaft 42 through the reverse idler gear 46f.

There is provided with a front drive shaft 31 through the hollow portion of the counter shaft 42 with a clearance "a" retained. The front drive shaft 31 is connected at the front end thereof with a pinion 31a meshing with a hypoid gear 32 constituting the front differential 30. Further, the front drive shaft 31 is rotatably supported at the front end thereof by the main case 14 through a taper roller bearing 31d and supported at the rear end thereof by the main case 14 through a ball bearing 31e. Further, the front drive shaft 31 is prevented from coming out of the taper roller bearing 31d by a rock nut 31f screwed on the front drive shaft 31.

Further, in the front drive shaft 31 there is provided with an oil supply hole 31c composed of an oil hole 31g and an oil hole 31h. The oil hole 31g is provided in the axial direction of the front drive shaft 31, being open to the front differential 30 at the front end of the front drive shaft and the oil hole 31h is provided in the radial direction of the front drive shaft 31, being open from the oil hole 31g to the clearance "a" formed by the inner periphery 42a of the counter shaft 42 and the outer periphery 31b of the front drive shaft 31.

A part of lubrication oil pumped up with the rotation of the hypoid gear 32 is drawn inside of the transmission gearing mechanism 40 through the oil supply hole 31c, the oil passage A and the oil hole 42b provided in the counter shaft 42 so as to lubricate respective components in the transmission gearing mechanism 40.

Next, describing the driving force distributing apparatus 50 with reference to FIG. 4, first the output shaft 41 is rotatably and coaxially coupled with a rear drive shaft 18 through a bushing 18a and a thrust bearing 18b.

The driving force distributing apparatus 50 comprises a differential mechanism 51 and a differential limiting mechanism 61 and the differential mechanism 51 is composed of a compound planetary gear type which includes a first sun gear 52 formed in the output shaft 41 and a second sun gear 54 formed in the rear drive shaft 18.

A carrier 55 is integrally formed with a flange 55a, a flange 55b and an arm 55c which connects the flange 55a on the front side and the flange 55b on the rear side, respectively. Further, a first pinion 53 is coaxially and integrally formed with a second pinion 56 and they are rotatably connected with the carrier 55 through a needle bearing 53a.

Further, the first sun gear 52 and the second sun gear 54 mesh with the first pinion 53 and the second pinion 56, respectively. The driving force is outputted from the second sun gear 54 to the rear drive shaft 18.

Further, the flange 55a on the front side is connected with a transfer drive gear 57 which is rotatably supported by the extension case 15 through a ball bearing 57a so as to output the driving force to the front drive shaft 31. The flange 55b on the rear side is rotatably supported at the boss 55d thereof by the rear drive shaft 18 through the ball bearing 55e.

On the other hand, the front drive shaft 31 is connected at the rear end thereof with a transfer driven gear 58 which meshes with the above transfer drive gear 57.

Since thus constituted, the driving force from the output shaft 41 is partly transferred to the front wheel side through the first sun gear 52, the first pinion 53, the carrier 55, the transfer drive gear 57, the transfer driven gear 58, the front drive shaft 31 and the front differential 30 and partly transferred to the rear wheel side the through the second pinion 56 which is integrally formed with the first pinion 53 and the second sun gear 54. The torque distribution ratio between the front wheel side and the rear wheel side is determined according to the gear specifications of the first and second pinions 53 and 56.

Thus constituted driving force distributing apparatus 50 has a differential function in that when a difference occurs in the rotation number between the front and rear wheels that difference is absorbed by the rotation or revolution of the first and second pinions 53 and 56.

Figure 5:
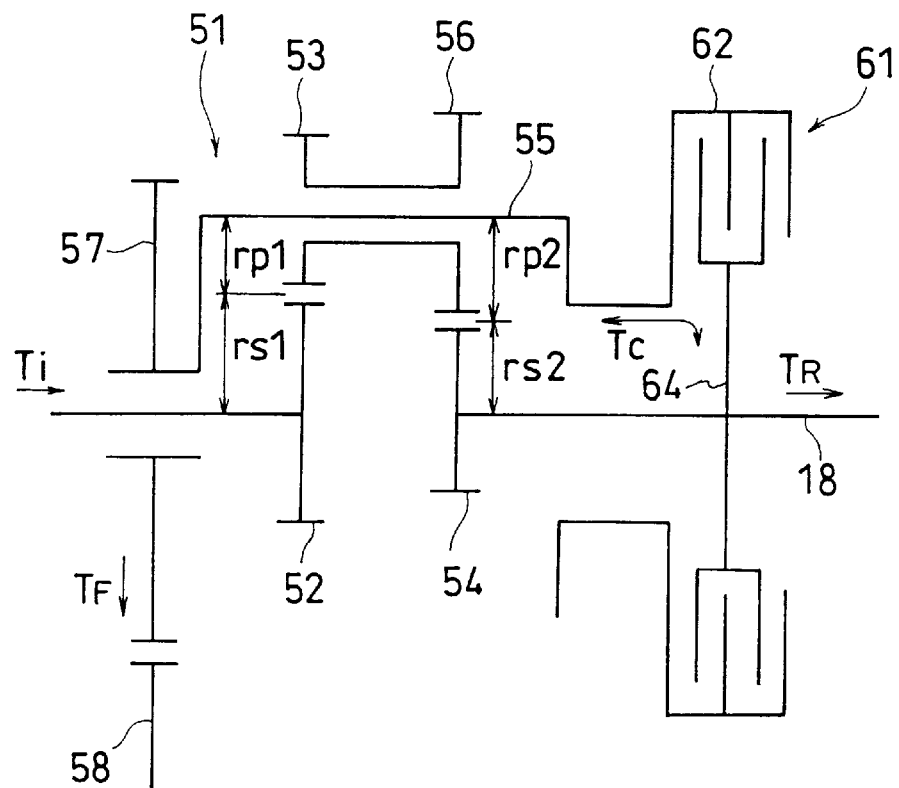
FIG. 5 is a schematic view showing a driving force distributing mechanism in a manual transmission according to a first embodiment of the present invention.

Next, the torque distribution of the differential section 51 will be described with reference to FIG. 5.

The following equations are formed:

$$T_i = T_F + T_R \tag{1}$$

$$r_{s1} + r_{p1} = r_{s2} + r_{p2} \tag{2}$$

where $T_i$ is an input torque of the first sun gear 52, $T_F$ is a front side torque of the carrier 55, $T_R$ is a rear side torque of the second sun gear 54, $r_{s1}$ is an intermeshing pitch circle radius of the first sun gear 52, $r_{p1}$ is an intermeshing pitch circle radius of the first pinion 53, $r_{s2}$ is an intermeshing pitch circle radius of the second sun gear 54, and $r_{p2}$ is an intermeshing pitch circle radius of the second pinion 56.

Further, since a tangential load P acting on the meshing point between the first sun gear 52 and the first pinion 53 is equal to a sum of a tangential load $P_1$ acting on the carrier 55 and a tangential load $P_2$ acting on the meshing point between the second sun gear 54 and the second pinion 56 and since $P = T_i/r_{s1}$, $P_1 = T_F/(r_{s1}+r_{p1})$ and $P_2 = T_R/r_{s2}$, the following equation is obtained:

$$T_i/r_{s1} = \{(T_F/(r_{s1}+r_{p1})\} + T_R/r_{s2} \tag{3}$$

Substituting the equations (1) and (2) into the equation (3), $$T_F = (1 - r_{p1} \cdot r_{s2}/r_{s1} \cdot r_{p2}) \cdot T_i$$

$$T_R = (r_{p1} \cdot r_{s2}/r_{s1} \cdot r_{p2}) \cdot T_i$$

Thus, it is understood that the torque distribution between the front side torque $T_F$ and the rear side torque $T_R$ can be varied arbitrarily by changing the intermeshing pitch circle radiuses of the first and second sun gears 52, 54 and the first and second pinions 53, 56, respectively.

Here, letting the intermeshing pitch circle radiuses $r_{s1}$, $r_{s2}$, $r_{p1}$ and $r_{p2}$ to be 23.5 millimeters, 21.2 millimeters, 18.5 millimeters and 18.8 millimeters respectively, $T_F=20/53 \cdot T_i$ and $T_R=33/53 \cdot T_i$ are obtained. Therefore, the torque distribution ratio between front and rear wheels is:

$$T_F : T_R \approx 38:62$$

Thus, a basic torque distribution ratio which is biased to the rear wheel has been obtained.

Referring to FIG. 4, the differential limiting mechanism 61 will be described.

The differential limiting mechanism 61 is provided between the carrier 55 and the rear drive shaft 18. A drum member 62 is connected with the flange 55b on the rear side of the carrier 55 and a drive plate 63a is spline-fitted to the inner side of the drum member 62. On the other hand, A drive plate 63b is spline-fitted to a hub member 64 which is spline-fitted to the rear drive shaft 18, and hereinafter the drive and driven plates 63a, 63b are arranged interchangeably.

The differential limiting mechanism 61 includes a hydraulic actuator comprising a cylinder section 66 formed by a boss member 15a of the extension case 15, a piston 68, a bearing 69 and a pressure plate 70. When hydraulic pressure adjusted by the hydraulic pressure control unit 17 is applied to a pressure chamber 67 defined by the cylinder section 66 and the piston 68, the hub member 64 is moved in the axial direction of the rear drive shaft 18 by the piston 68 through the pressure plate 70 to press the driven plate 63b upon the drive plate 63a. As a result, friction force is generated between the drive and driven plates 63a, 63b to produce a clutch torque $T_C$ which is variable according to hydraulic pressure controlled by the hydraulic pressure control unit 17.

Input signals of the hydraulic control unit 17 are ones fed at least from a front wheel rotation sensor 17a, a rear wheel rotation sensor 17d, a steering angle sensor 17c and a shift position sensor 17d.

Figure 6:
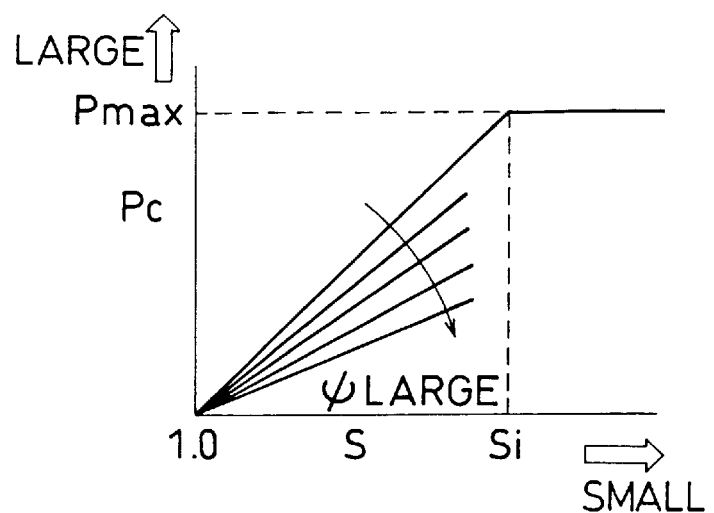
FIG. 6 shows an example of a map for retrieving a clutch pressure.

A front wheel rotation number $N_F$ detected by the front wheel rotation sensor 17a and a rear wheel rotation number $N_R$ detected by the rear wheel rotation sensor 17b are inputted to the hydraulic control unit 17, respectively. When the vehicle slips on a slippery road, first the rear wheel causes a slip because the rear wheel torque $T_R$ is always larger than the front wheel torque $T_F$, as described before. Then, the detected rear wheel rotation number $N_R$ is larger than the detected front wheel rotation number $N_F$, therefore a calculated slip ratio $S=N_F/N_R$ is smaller than 1. On the other hand, a steering angle $\psi$ detected by the steering angle sensor 17c is inputted to the hydraulic pressure control unit 17. In the hydraulic pressure control unit 17, a clutch pressure $P_C$ is retrieved from a map parameterizing the steering angle $\psi$ as shown in FIG. 6 based on the calculated slip ratio "S".

The clutch pressure $P_C$ is established to be a low value Pmin in a situation where no slip occurs, i.e., $S \geq 1$. On the other hand, the clutch pressure $P_C$ is established so as to increase as the slip ratio S decreases in a situation where a slip occurs, i.e., $S<1$ and so as to become a constant value Pmax when the slip ratio S is smaller than a specified value $S_1$. Further, the clutch pressure $P_C$ is established so as to become small as the steering angle $\psi$ becomes large in order to avoid so-called tight-cornering brake phenomenon. The line pressure is adjusted to this clutch pressure $P_C$ to control the clutch torque $T_C$ of the differential limiting section 61.

Next, an operation of thus constituted manual transmission will be described.

The driving force of the engine 10 is transmitted to the input shaft 21 through the crank shaft 11 and the clutch 20. Then, the driving force is transmitted to the transmission gearing mechanism 40 through the input drive gear 29, the counter driven gear 43 and the counter shaft 42.

The 3rd drive gear 44c, the 2nd drive gear 44b, the 1st drive gear 44a, the reverse drive gear 44f which are integrally formed with the counter shaft 42 and the 5th drive gear 44e which is spline-fitted to the counter shaft 42, drive the 3rd driven gear 45c, the 2nd driven gear 45b, the 1st driven gear 45a, the reverse idler gear 46f and the 5th driven gear 45e, respectively. Further, the reverse driven gear 45f is driven by the reverse idler gear 46f. When the synchronizers 47, 48 and 49 are in the neutral position, the driving force ceases transmission.

Figure 7:
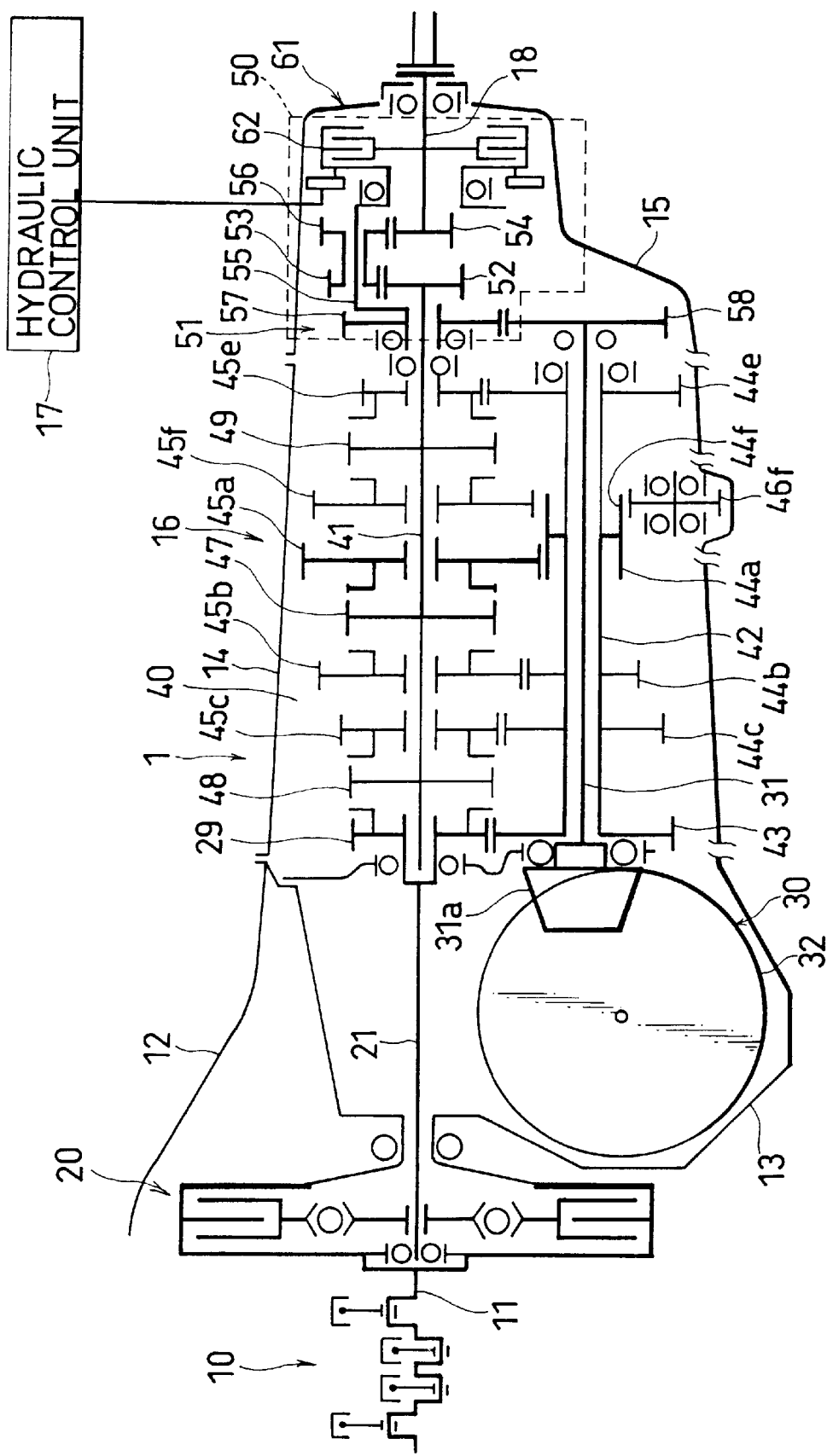
FIG. 7 is a schematic drawing showing a manual transmission according to a first embodiment of the present invention.

At the 1st speed, the sleeve 47a of the first synchronizer 47 is shifted backward to engage the 1st driven gear 45a with the output shaft 41 and the driving force is transmitted as shown by a bold line in FIG. 7. That is to say, the driving force of the engine 10 is transmitted to the output shaft 41 via the clutch 20, the input shaft 21, the input drive gear 29, the counter driven gear 43, the counter shaft 42, the 1st drive gear 44a, the 1st driven gear 45a and the first synchronizer 47. Then, the rotation speed of the engine 10 is reduced to the 1st speed according to the number of gears of the 1st driven gear 44a and the 1st driven gear 45a. Further, the driving force transmitted to the output shaft 41 is inputted from the first sun gear 52 provided at the rear end of the output shaft 41 to the driving force distributing apparatus 50.

Figure 8:
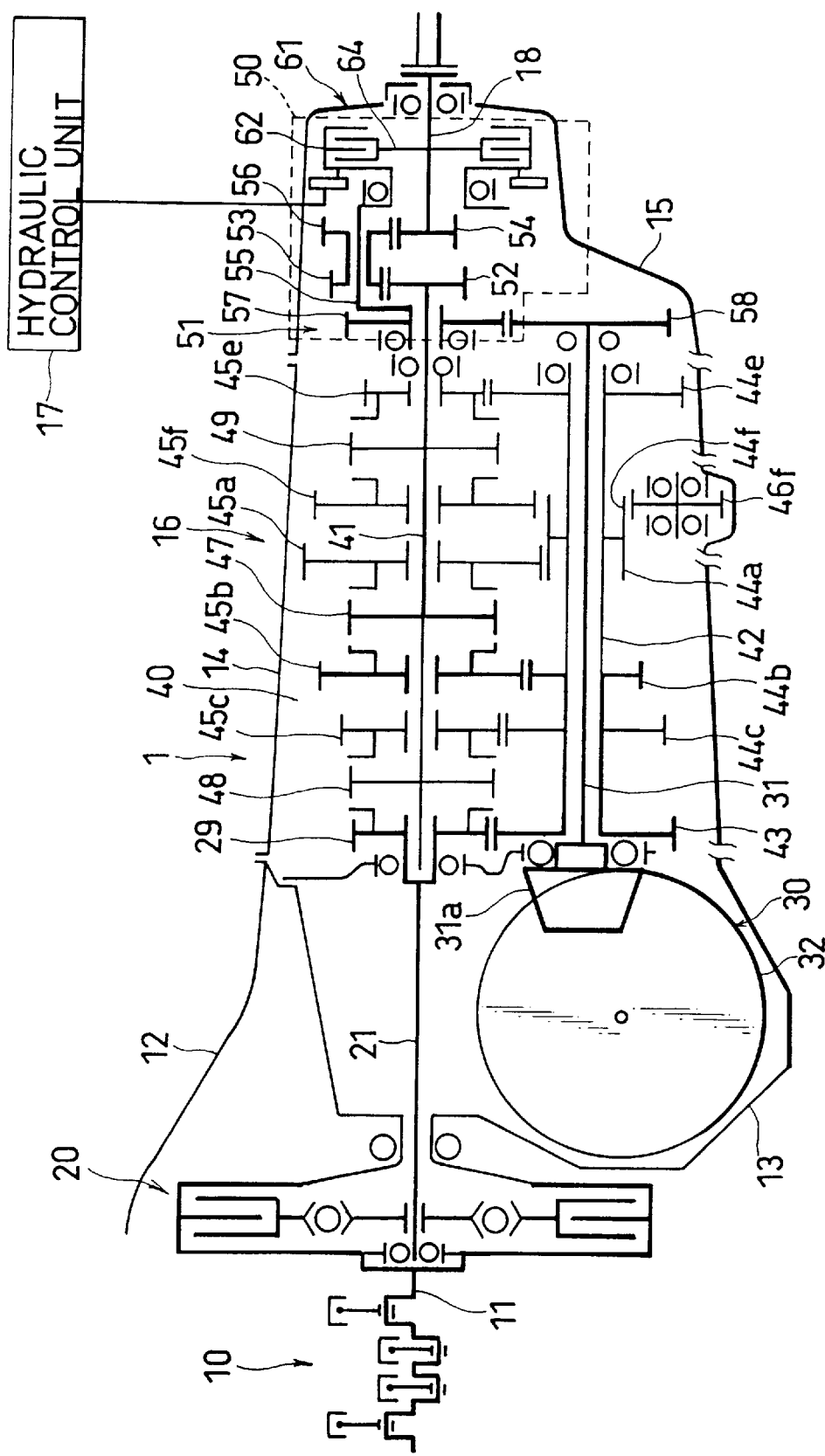
FIG. 8 is a schematic drawing showing a manual transmission according to a first embodiment of the present invention.

Similarly, at the 2nd speed, the sleeve 47a of the first synchronizer 47 is shifted forward to engage the 2nd driven gear 45b with the output shaft 41 and the driving force is transmitted as shown by a bold line in FIG. 8. That is to say, the driving force of the engine 10 is transmitted to the output shaft 41 through the 2nd drive gear 44b, the 2nd driven gear 45b and the first synchronizer 47. Then, the rotation speed of the engine 10 is reduced to the 2nd speed according to the number of gears of the 2nd driven gear 44b and the 2nd driven gear 45b. Further, the driving force transmitted to the output shaft 41 is inputted from the first sun gear 52 to the driving force distributing apparatus 50.

Figure 9:
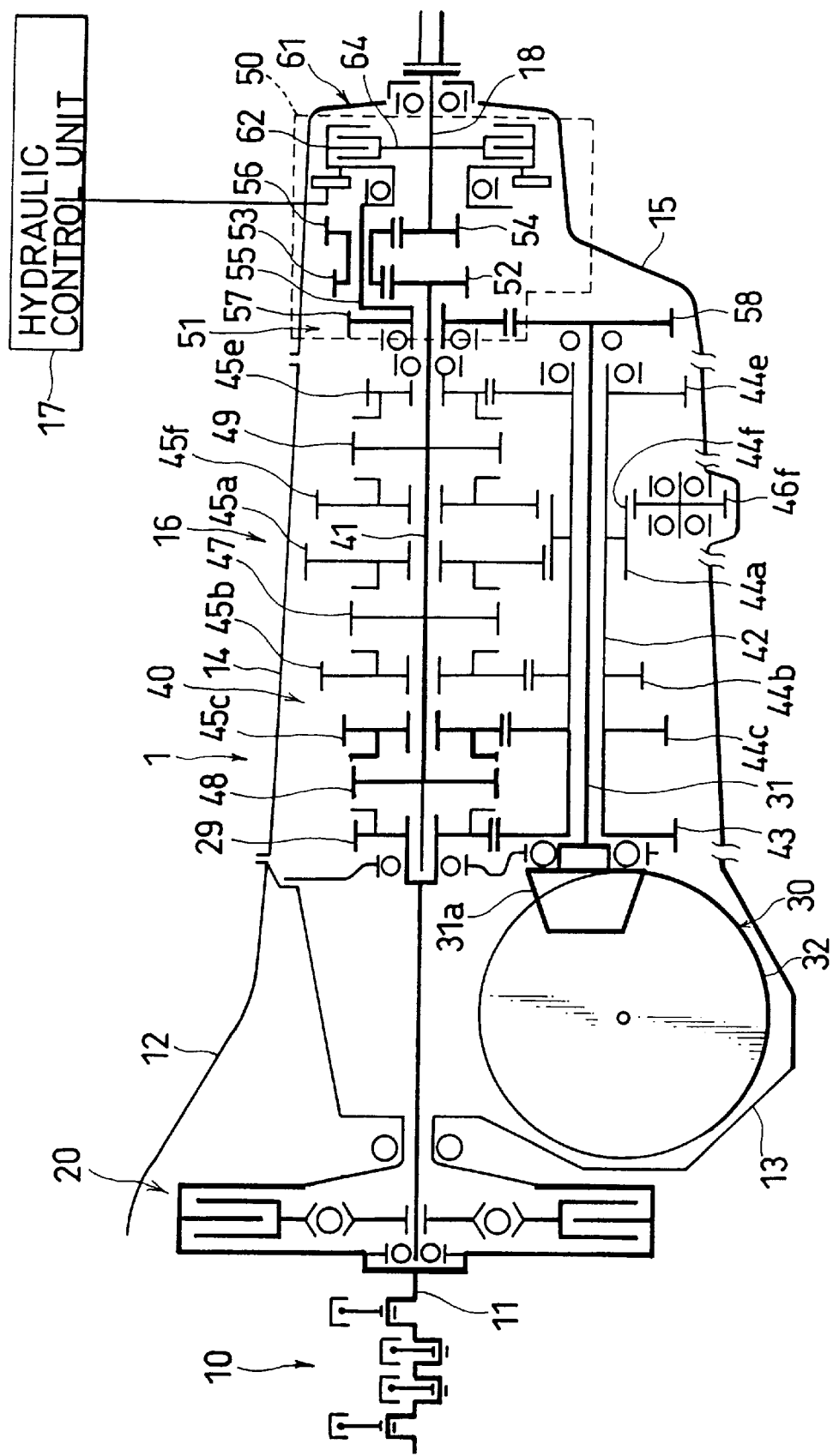
FIG. 9 is a schematic drawing showing a manual transmission according to a first embodiment of the present invention.

Similarly, at the 3rd speed, the sleeve 48a of the second synchronizer 48 is shifted backward to engage the 3rd driven gear 45c with the output shaft 41 and the driving force is transmitted as shown by a bold line in FIG. 9. That is to say, the driving force of the engine 10 is transmitted to the output shaft 41 through the 3rd drive gear 44c, the 3rd driven gear 45c and the second synchronizer 48. Then, the rotation speed of the engine 10 is reduced to the 3rd speed according to the number of gears of the 3rd driven gear 44c and the 3rd driven gear 45c. Further, the driving force transmitted to the output shaft 41 is inputted from the first sun gear 52 to the driving force distributing apparatus 50.

Figure 10:
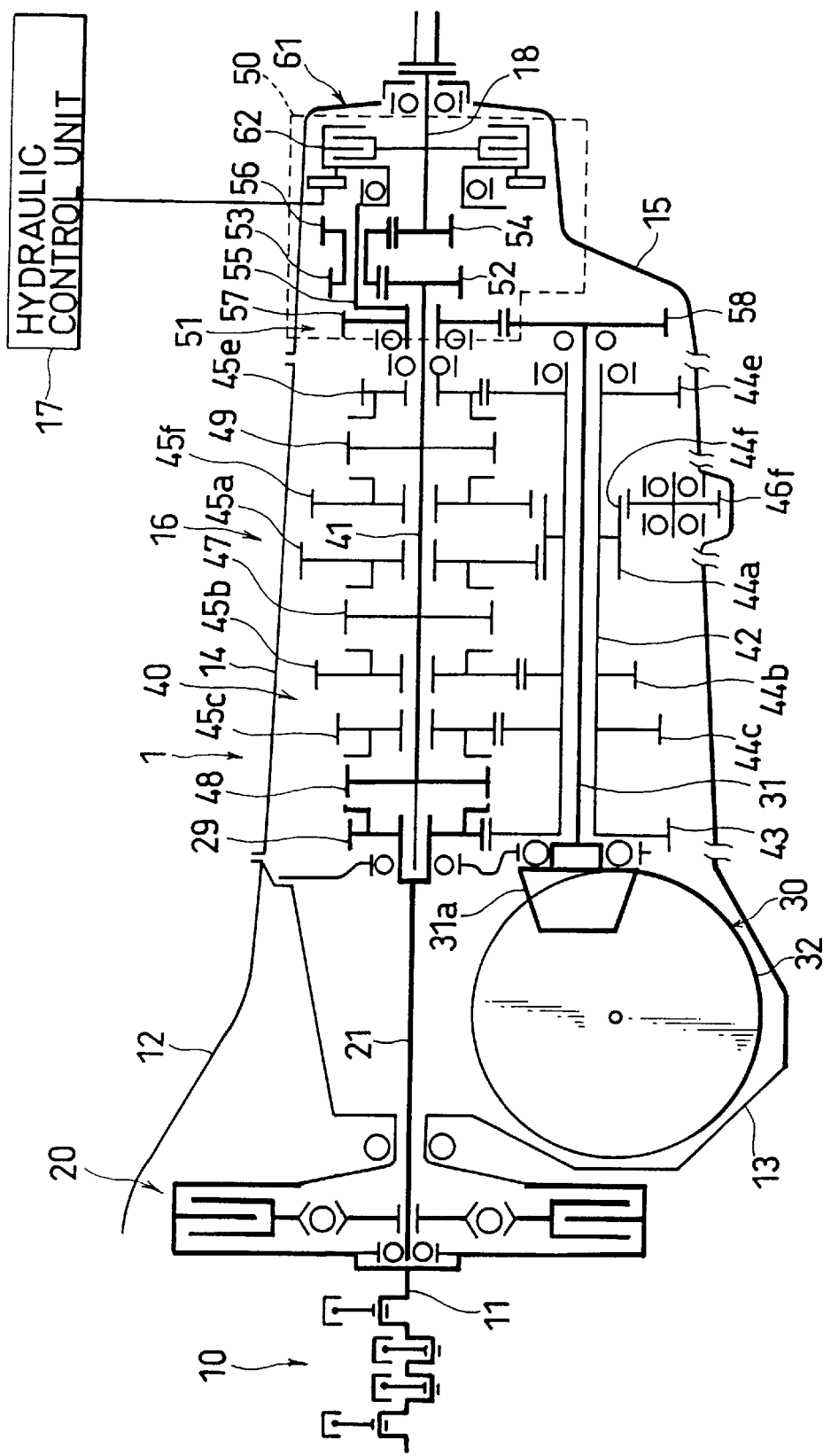
FIG. 10 is a schematic drawing showing a manual transmission according to a first embodiment of the present invention.

At the 4th speed, the sleeve 48a of the second synchronizer 48 is shifted forward to engage the input shaft 21 with the output shaft 41 directly and the driving force is transmitted as shown by a bold line in FIG. 10. That is to say, the rotational speed of the engine 10 inputted to the input shaft 21 through the clutch 20 is directly transferred to the output shaft 41 through the second synchronizer 48 and is inputted from the first sun gear 52 to the driving force distributing apparatus 50.

Figure 11:
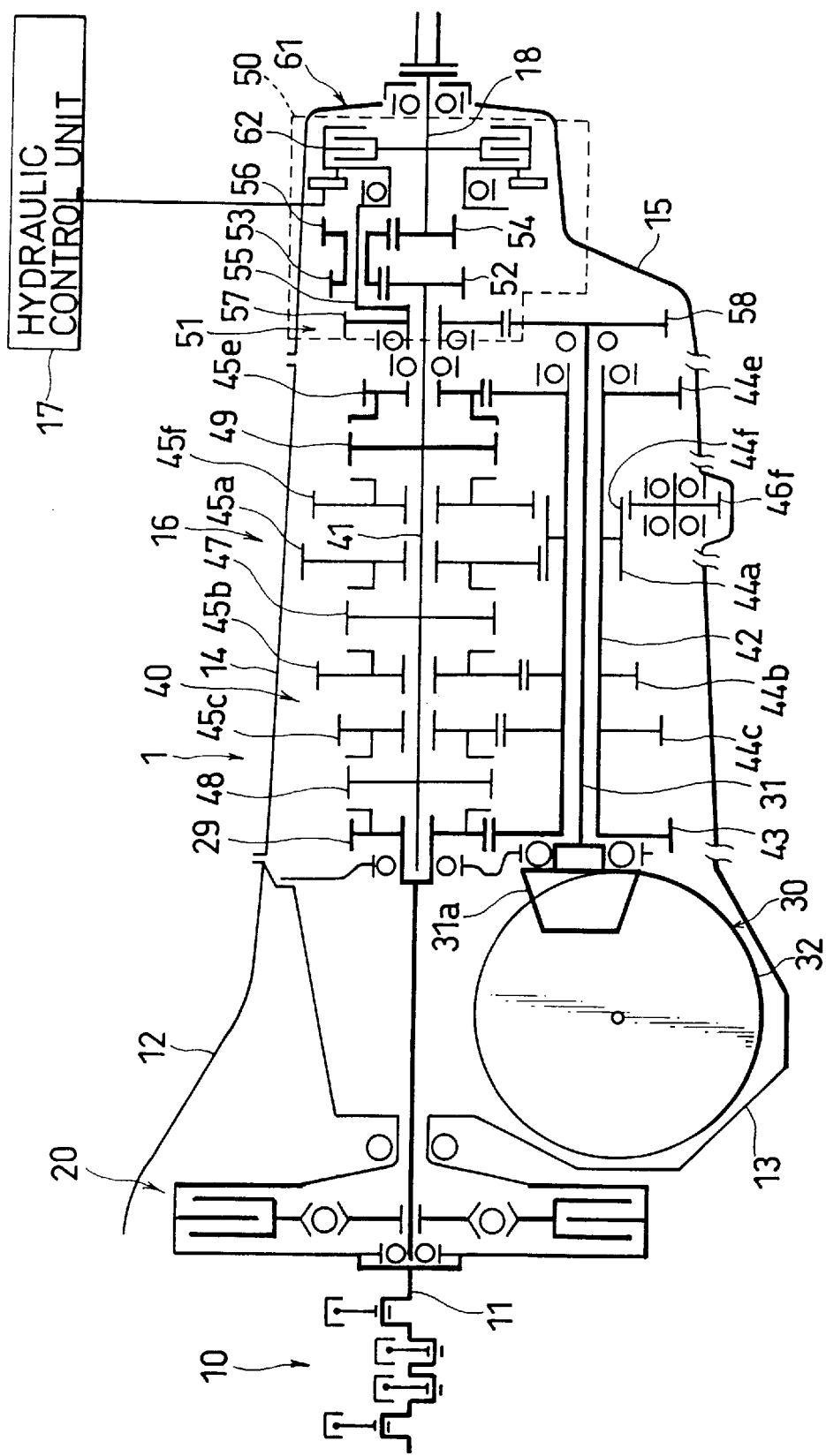
FIG. 11 is a schematic drawing showing a manual transmission according to a first embodiment of the present invention.

At the 5th speed, the sleeve 49a of the third synchronizer 49 is shifted backward to engage the 5th driven gear 45e with the output shaft 41 and the driving force is transmitted as shown by a bold line in FIG. 11. That is to say, the driving force of the engine 10 is transmitted to the output shaft 41 through the clutch 20, the input shaft 21, the input driven gear 29, the counter driven gear 43, the counter shaft 42, the 5th drive gear 44e, the 5th driven gear 45e and the third synchronizer 49. Then, the rotation speed of the engine 10 is increased to the 5th speed according to the number of gears of the 5th driven gear 44e and the 5th driven gear 45e. Further, the driving force transmitted to the output shaft 41 is inputted from the first sun gear 52 to the driving force distributing apparatus 50.

An example of thus obtained shift speeds is as follows:

| | |
|---|---|
| 1st speed | 3.214 |
| 2nd speed | 1.952 |
| 3rd speed | 1.302 |
| 4th speed | 1.000 |
| 5th speed | 0.752 |

The driving force outputted from the transmission gearing mechanism 40 is inputted to the driving force distributing apparatus 50 through the first sun gear 52 provided at the rear end of the output shaft 41 and is distributed into the transfer driven gear 57 integrally formed with the carrier 56 and the second sun gear 54. In this embodiment, the basic torque distribution ratio is established to be $T_F:T_R=38:62$, that is, 38% of the driving force is transferred to the transfer driven gear 57 and 62% is transferred to the second sun gear 54.

On the other hand, the front wheel rotation number $N_F$ of the front wheel rotation sensor 17a, the rear wheel rotation number $N_R$ of the rear wheel rotation sensor 17b and the steering angle $\psi$ of the steering angle sensor 17c are inputted to the hydraulic pressure control unit 17 and the slip ratio "S" is calculated therein.

When the vehicle runs on a dry road in a non-slip state ($S \geq 1$), in the hydraulic pressure control unit 17c the clutch pressure $P_C$ is established to be a low value $P_{min}$ and the differential limiting mechanism 61 is released. As a result, the clutch torque becomes 0 (zero) and therefore the differential mechanism 51 is set free.

Accordingly, 38% of the output torque outputted to the transfer drive gear 57 is directly transmitted to the front wheel through the transfer driven gear 58, the front drive shaft 31 and the front differential 30. Further, 62% of the output torque outputted to the second sun gear 54 is transmitted to the rear wheel through the rear drive shaft 18, the propeller shaft 4 and the rear differential 5.

This torque distribution biased to the rear wheel eliminates an under-steer tendency of the vehicle and resultantly an excellent maneuverability can be obtained. Further, since the differential section 51 absorbs the rotational difference between the front and rear wheels, the vehicle can be make a smooth turn.

When the vehicle runs on a slippery road, first the rear wheel causes a slip because of the torque distribution biased to the rear wheel. Then, in the hydraulic control unit 17 the slip ratio S (S<1) is calculated based on the front wheel rotation number $N_F$ and the rear wheel rotation number $N_R$. Then, the clutch pressure $P_C$ is retrieved from the map based on the calculated slip ratio "S" and the line pressure adjusted to the clutch pressure $P_C$ is applied to the clutch to generate a specified clutch torque $T_C$.

Figure 12:
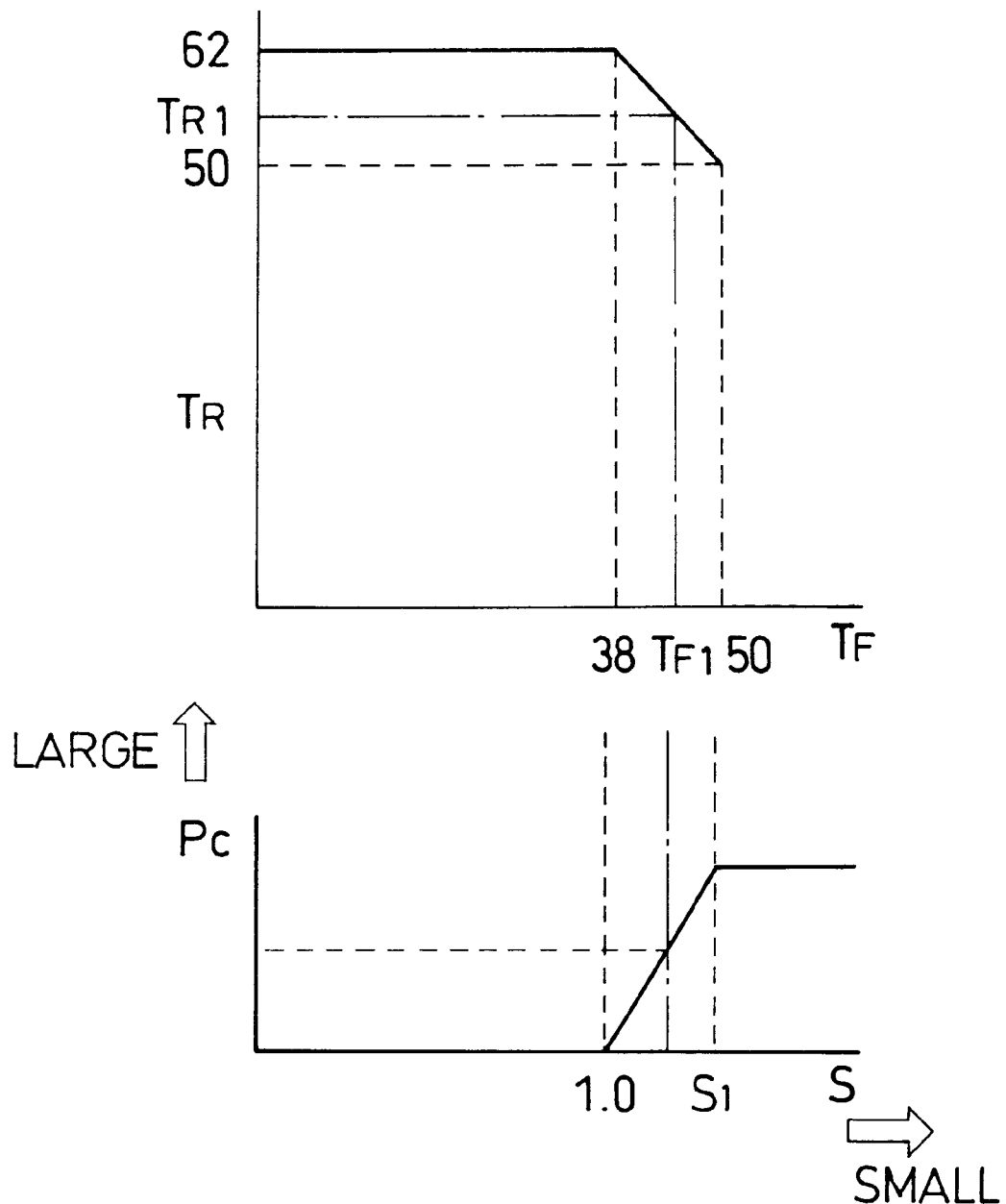
FIG. 12 is a diagram for explaining a torque distribution between a font and rear wheels.

Thus, a transfer pass bypassing two output elements, the carrier 55 and the second sun gear 54 is formed in the differential section 51 and a clutch torque is transferred from the second sun gear 54 to the carrier 55 through the transfer pass. That is to say, the torque distribution ratio is changed from 38:62 to $T_{F1}:T_{R1}$ as illustrated in FIG. 12. As a result, the front wheel torque is increased and the rear wheel torque is decreased, thereby the rear wheel ceases slipping. When the slip ratio "S" becomes smaller than a specified value $S_1$, hydraulic pressure reaches the maximum value Pmax and the clutch torque TC becomes maximum. That is, in this state, the carrier 56 is directly connected with the second sun gear 54 and the differential section 51 is in the lock condition. When the differential section 51 is locked, the torque distribution ratio becomes a ratio corresponding to axial loads of the front and rear wheel. Thus, it is possible to make a wide control on the torque distribution according to the state of slip. Further, when the vehicle makes a turn while being subjected to the torque distribution control, the differential limiting torque is established so as to become small with an increase of the steering angle $\psi$. As a result, the rotational difference between the front and rear wheel is well absorbed, a tight corner barking can be prevented.

The basic torque distribution ratio and the torque distribution control characteristic described in this embodiment are just examples and it is needless to say that those may be arbitrarily established otherwise.

According to the first embodiment of the present invention, the manual transmission comprises the output shaft 41, the counter shaft 42 provided below the output shaft 41 in parallel, the transmission gearing mechanism 40 provided between the output shaft 41 and the counter shaft 42, the input shaft 21 for inputting the driving force of the engine 10 to the transmission gearing mechanism 40, the driving force distributing apparatus 50 provided on the output shaft 41 for distributing torque into the rear drive shaft 18 and the front drive shaft 31. As one feature of this embodiment, since the driving force distributing apparatus is arranged on the same axis as the output shaft 41, the driving force distributing apparatus 50 can be disposed at a relatively high position of the transmission case 16 and as a result the static level of lubrication oil comes to the lower part of the driving force distributing apparatus 50.

Therefore, the amount of oil pumped up by the driving force distributing apparatus 50 can be reduced, this resulting in a reduction of agitation resistance of oil and providing an improvement in power transmission efficiency and fuel economy. Especially, in case where the vehicle runs in high speeds, it is being accelerated or it is rising a grade, these effects are more noticeable.

Further, this small amount of pumped-up oil prevents a lowering of oil level in the transmission gearing mechanism 40, this leading to saving the amount of lubrication oil in the transmission case 16.

Further, the reduction of agitation resistance of oil prevents an increase of oil temperature, this resulting in preventing lubrication oil from being deteriorated, preventing gears from wearing or improving the durability of oil seals and the like.

Furthermore, since the front drive shaft 31 is rotatably fitted to the counter shaft 42 which is hollow-shaped, a more compact transmission can be realized, compared with a construction in which the front drive shaft 31 is mounted in parallel with the counter shaft 42. Further, since lubrication oil for lubricating the transmission gears is pumped up by the rotation of the hypoid gear 32 and it is always supplied from the oil supply hole A which is connected to the oil hole 31c leading to the hypoid gear 32, lubrication of the transmission gears is performed properly. That is to say, the transmission gears can be lubricated sufficiently with a small amount of lubrication oil.

Further, since the driving force distributing apparatus 50 is arranged at a relatively high position, a space under the driving force distributing apparatus 50 can be used for accommodating supporting members like mounting brackets, a transmission control system, a steering system, an exhaust system and the like. This facilitates an interchangeability with an automatic transmission.

Next, a second embodiment of the present invention will be described with reference to FIG. 13 and FIG. 14.

Figure 13:
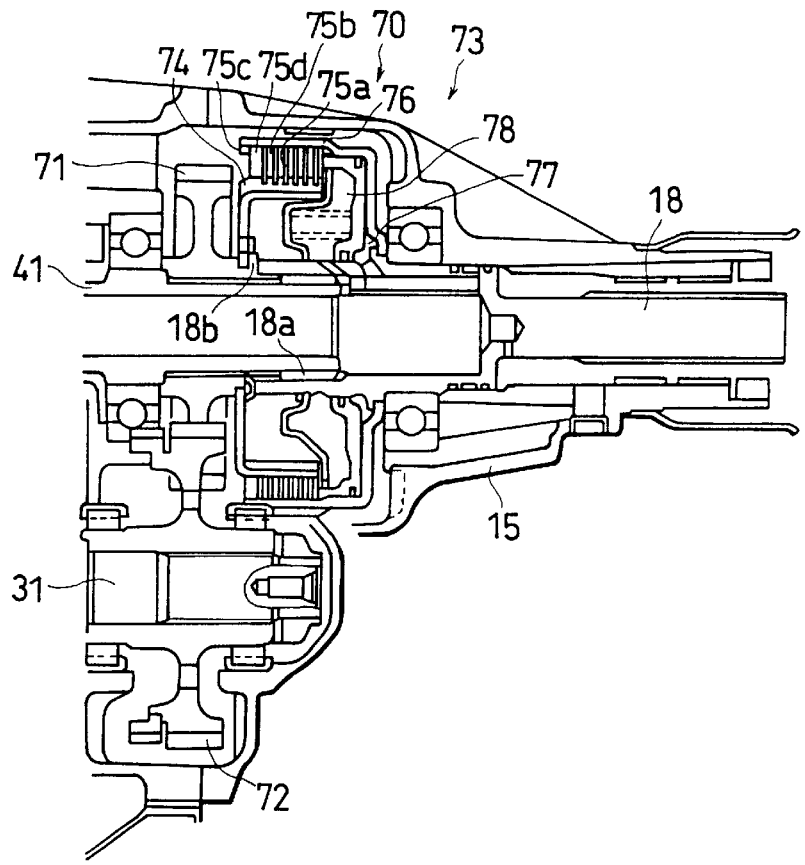
FIG. 13 is a cross sectional view showing a driving force distributing apparatus according to a second embodiment of the present invention.
Figure 14:
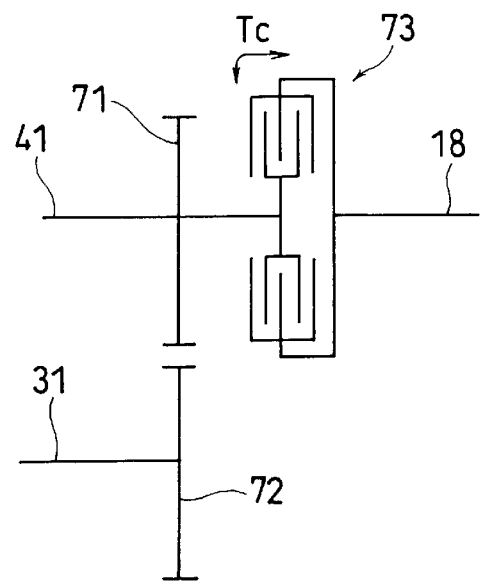
FIG. 14 is a schematic view for explaining a torque transmission of a driving force distributing apparatus according to a second embodiment of the present invention.

Referring to FIG. 13, the output shaft 41 is rotatably fitted to the rear drive shaft 18 through the bushing 18a and the thrust bearing 18b. A transfer drive gear 71 is spline-fitted to the output shaft 41 and a transfer driven gear 72 meshing with the transfer drive gear 71 is fixed to the rear end of the front drive shaft 31 provided below the output shaft 41 in parallel. Therefore, an output from the output shaft 41 is constantly transmitted to the front drive shaft 31.

Further, there is provided with a differential limiting mechanism 73 between the output shaft 41 and the rear drive shaft 18. In the differential limiting mechanism 73, a hub member 74 is integrally connected with the output shaft 41 through the transfer drive gear 71 and a drive plate 75a is spline-fitted to the outer periphery of the hub member 74. On the other hand, a drum member 76 is integrally connected with the rear drive shaft 18 and a driven plate 75b is spline-fitted to the inner periphery of the drum member 76. Both drive and driven plates 75a, 75b are arranged interchangeably so as to transfer torque from the output shaft 41 to the rear drive shaft 18.

Further, a piston 78 is slidably inserted to a hydraulic chamber 77 so as to generate a clutch torque $T_C$ by pressing the drive plate 75a and the driven plate 75b on a retaining plate 75d contacting a snap ring 75c fitted to the drum member 76. The clutch torque $T_C$ is variably controlled by the hydraulic control unit 17.

Describing an operation of thus constituted manual transmission for a four wheel drive vehicle, the driving force shifted by the transmission gearing mechanism 40 is partly transmitted to the front drive shaft 31 through the transfer drive gear 71 and the transfer driven gear 72 and partly transmitted to the rear drive shaft 18 through the differential limiting mechanism 73.

On the other hand, the front wheel rotation number $N_F$ of the front wheel rotation sensor 17a, the rear wheel rotation number $N_R$ of the rear wheel rotation sensor 17b and the steering angle $\psi$ of the steering angle sensor 17c are inputted to the hydraulic control unit 17 and the slip ratio "S" is calculated therein.

Based upon the front wheel rotation number $N_F$, the rear wheel rotation number $N_R$ and the steering angle $\psi$, the clutch pressure $P_C$ is calculated so as to generate a required clutch torque $T_C$.

Thus formed transfer pass provides a continuous torque distribution control according to running conditions or road conditions between the output shaft 41 and the rear drive shaft 18 over a wide range from a direct drive type four wheel drive condition in which the output shaft 41 is directly connected with the rear drive shaft 18 to a pure front drive condition in which only the front drive shaft 31 is driven by the output shaft 41. Further, when the vehicle turns, the clutch torque $T_C$ is reduced as the steering angle $\psi$ increases and as a result the rotational difference between the front and rear wheels is absorbed, thereby tight cornering brake phenomena can be prevented.

Figure 15:
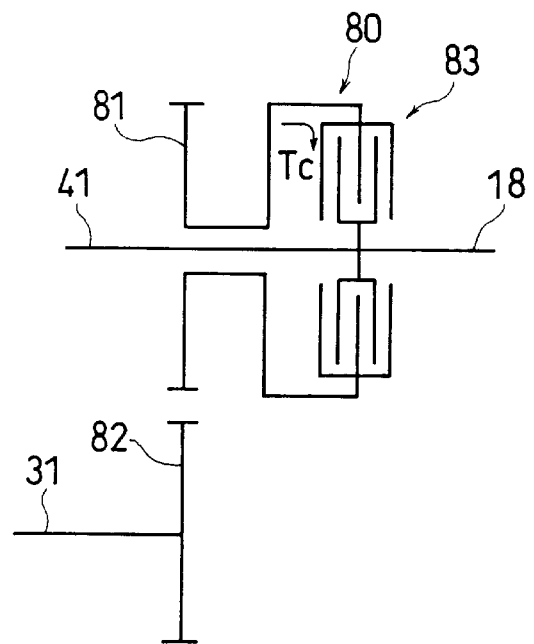
FIG. 15 is a schematic view for explaining a torque transmission of a driving force distributing apparatus according to a third embodiment of the present invention.

Next, a third embodiment of the present invention will be described with reference to FIG. 15.

The output shaft 41 is spline-fitted to the rear drive shaft 18 and a transfer drive gear 81 is rotatably supported by the output shaft 41. Further, a transfer driven gear 82 meshing with the transfer drive gear 81 is fixed to the rear end of the front drive shaft 31 arranged below the output shaft 41 in parallel.

Further, a differential limiting mechanism 83 constituted by a multiple disc clutch is incorporated between the output shaft 41 and the transfer drive gear 81.

Accordingly, the driving force from the transmission gearing mechanism 40 is transmitted partly to the rear drive shaft 18 through the output shaft 41 and partly to the front drive shaft 31 through the differential limiting mechanism 83, the transfer drive gear 81 and the transfer driven gear 82.

Further, based upon the front wheel rotation number $N_F$, the rear wheel rotation number $N_R$ and the steering angle $\psi$, the clutch pressure $P_C$ is calculated so as to generate a required clutch torque $T_C$.

Thus formed transfer pass provides a continuous torque distribution control according to running conditions or road conditions between the output shaft 41 and the front drive shaft 31 over a wide range from a direct drive type four wheel drive condition in which the output shaft 41 is directly connected with the front wheel to a pure rear drive condition in which only the rear drive shaft 31 is driven by the output shaft 41. Further, when the vehicle turns, the clutch torque $T_C$ is reduced as the steering angle $\psi$ increases and as a result the rotational difference between the front and rear wheels is absorbed, thereby tight-cornering brake phenomena can be prevented.

Figure 16:
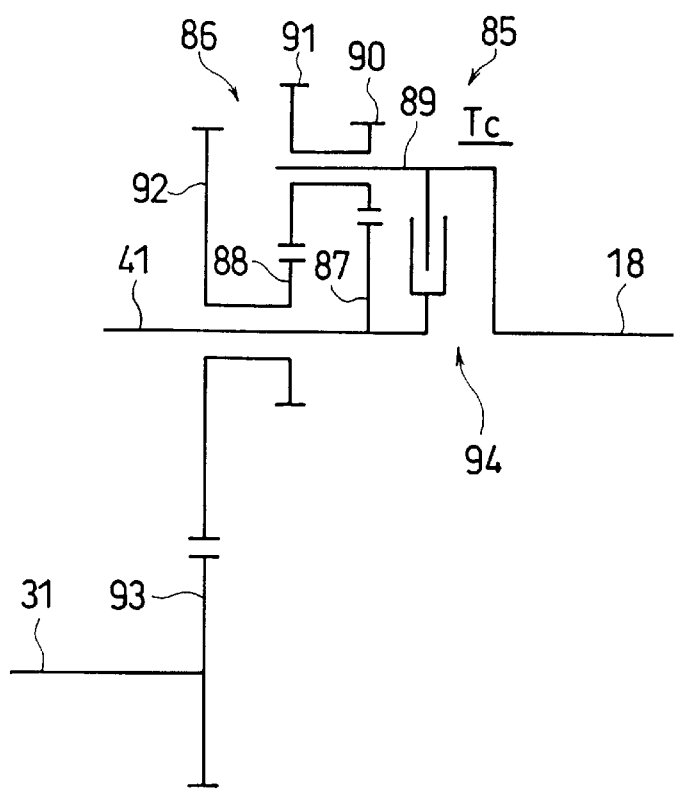
FIG. 16 is a schematic view for explaining a torque transmission of a driving force distributing apparatus according to a fourth embodiment of the present invention.

Next, a fourth embodiment of the present invention will be described with reference to FIG. 16.

The output shaft 41 of the manual transmission gearing mechanism 40 is rotatably arranged around the same axis as the rear drive shaft 18. The driving force distributing apparatus 85 comprises a differential mechanism 86 and a differential limiting mechanism 94. The differential mechanism 86 is constituted by a compound type planetary gears which includes a first sun gear 87 connected with the output shaft 41 and a second sun gear 88 rotatably supported by the output shaft 41.

The rear drive shaft 18 is connected with one end of a carrier 89. Further, a first and second pinion 90, 91 are formed integrally and rotatably supported by the carrier 89. The first pinion 90 meshes with the first sun gear 87 and the second pinion 91 meshes with the second sun gear 88.

The second sun gear 88 is connected with a transfer drive gear 92 rotatably supported by the output shaft 41. Further, a transfer driven gear 93 is connected with the end of the front drive shaft 31 which is arranged below the output shaft 41 in parallel.

Therefore, the driving force inputted from the first sun gear 87 is partly transmitted to the front wheel side through the second sun gear 88, the transfer drive gear 92, the transfer driven gear 93 and the front drive shaft 31 and partly transmitted to the rear wheel side through the carrier 89 and the rear drive shaft 18. The torque distribution ratio is determined from the gear specifications of the planetary gear set. When a rotational difference occurs between the front and rear wheels, the rotational difference is absorbed by the rotation and revolution of the pinions 90, 91.

Further, a differential limiting mechanism 94 constituted by a multiple disc clutch is provided between the output shaft 41 and the carrier 89 so as to generate a clutch torque $T_C$ based on signals of the front wheel rotation number $N_F$, the rear wheel rotation number $N_R$ and the steering angle $\psi$.

Therefore, by generating the clutch torque $T_C$ according to running conditions in the differential limiting mechanism 94 it is possible to change the torque distribution ratio over a range from the basic torque distribution ratio determined from the gear specifications to the basic torque distribution ratio according to the direct drive type four wheel drive running. Further, since the differential limiting torque of the differential limiting mechanism 94 can be reduced according to the steering angle ψ, tight-cornering brake phenomena can be prevented by reducing or minimizing the clutch torque.

Figure 17:
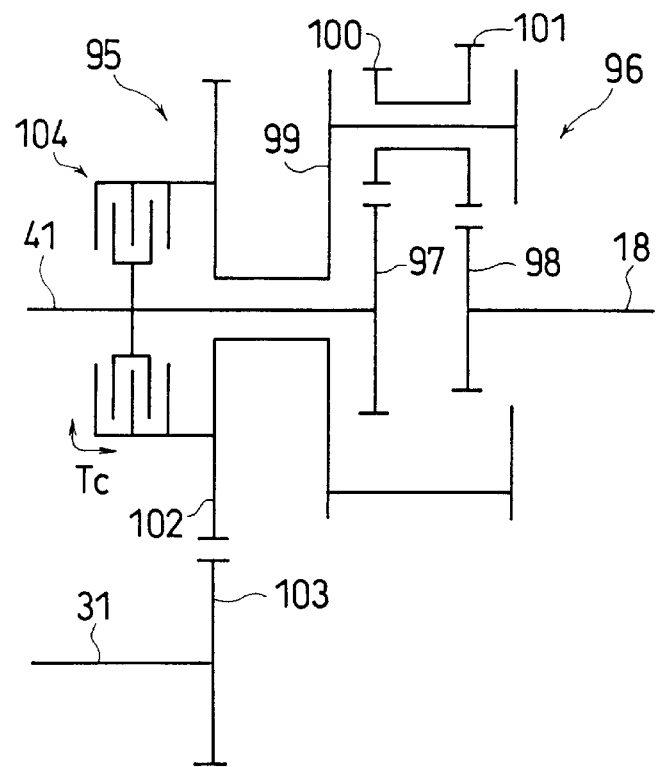
FIG. 17 is a schematic view for explaining a torque transmission of a driving force distributing apparatus according to a fifth embodiment of the present invention.

FIG. 17 indicates a fifth embodiment of the present invention. The output shaft 41 of the transmission gearing mechanism 40 is rotatably arranged around the same axis as the rear drive shaft 18. The driving force distributing apparatus 95 comprises a differential mechanism 96 and a differential limiting mechanism 104. The differential mechanism 96 is constituted by a compound type planetary gears which includes a first sun gear 97 connected with the output shaft 41 and a second sun gear 98 connected with the rear drive shaft 18.

A transfer drive gear 102 is rotatably mounted on the output shaft 41 and it is connected with a carrier 99. Further, a first and second pinions 100, 101 which are formed integrally are rotatably supported by the carrier 99 and mesh with the first and second sun gears 97 and 98, respectively. The transfer drive gear 102 meshes with a transfer driven gear 103 connected with the rear end of the front drive shaft 31.

In the driving force distributing apparatus 95 thus constituted, the driving force inputted to the first sun gear 97 is transmitted partly to the front wheel side through the carrier 99, the transfer drive gear 102, the transfer driven gear 103 and the front drive shaft 31 and partly to the rear wheel side through the second sun gear 98 and the rear drive shaft 18. At this time, the torque distribution is performed according to the basic torque distribution ratio determined from gear specifications of the planetary gear set. Further, when a rotational difference occurs between the front and rear wheels, the rotational difference is absorbed by the rotation and revolution of the first and second pinions 100 and 101.

Further, a differential limiting mechanism 104 constituted by a multiple disc clutch is provided between the output shaft 41 and the carrier 99 so as to generate a clutch torque $T_C$ based on signals of the front wheel rotation number $N_F$, the rear wheel rotation number $N_R$ and the steering angle ψ.

Hence, by generating the clutch torque $T_C$ according to running conditions in the differential limiting mechanism 104 it is possible to change the torque distribution ratio between the front and rear wheels over a range from the basic torque distribution ratio determined from the gear specifications of the planetary gear set to the torque distribution ratio according to the four wheel drive running with direct drive. Further, since the differential limiting torque of the differential limiting mechanism 104 can be reduced according to the steering angle ψ, tight corner braking phenomena can be prevented by reducing or minimizing the clutch torque.

Figure 18:
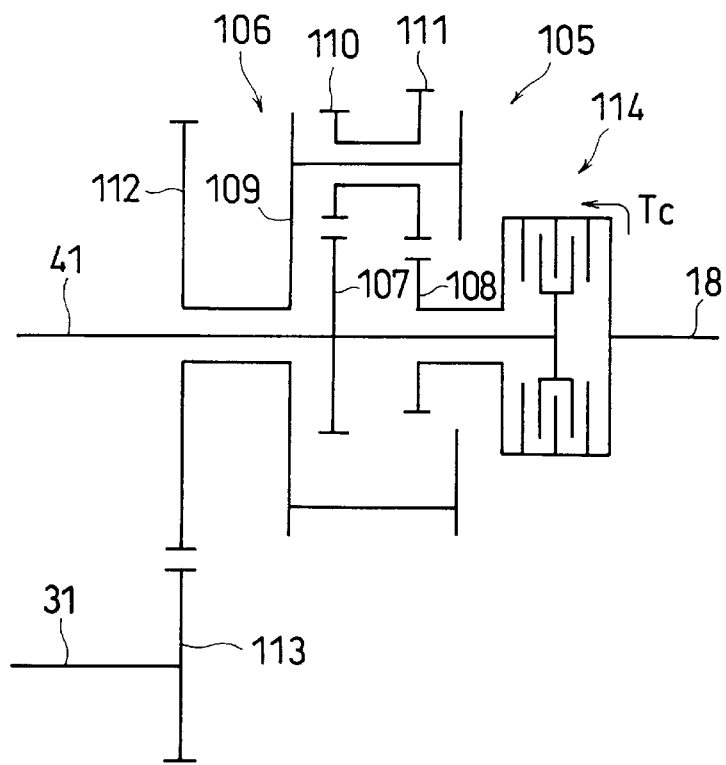
FIG. 18 is a schematic view for explaining a torque transmission of a driving force distributing apparatus according to a sixth embodiment of the present invention.

FIG. 18 indicates a sixth embodiment of the present invention. The output shaft 41 of the transmission gearing mechanism 40 is rotatably arranged around the same axis as the rear drive shaft 18. The driving force distributing apparatus 105 comprises a differential mechanism 106 and a differential limiting mechanism 114. The differential mechanism 106 is constituted by a compound type planetary gears which includes a first sun gear 107 connected with the output shaft 41 and a second sun gear 108 rotatably mounted on the output shaft 41.

A transfer drive gear 112 is rotatably mounted on the output shaft 41 and it is connected with a carrier 109.

Further, a first and second pinions 110, 111 which are formed integrally are rotatably supported by the carrier 109 and mesh with the first and second sun gears 107 and 108, respectively. Further, the second sun gear 108 is connected with the rear drive 18.

Further, a transfer driven gear 113 meshing with the transfer drive gear 112 is connected with the rear end of the front drive shaft 31 which is arranged below the output shaft 41 in parallel.

In the driving force distributing apparatus 105 thus constituted, the driving force inputted to the first sun gear 107 is transmitted partly to the front wheel side through the carrier 109, the transfer drive gear 112, the transfer driven gear 113 and the front drive shaft 31 and partly to the rear wheel side through the second sun gear 108 and the rear drive shaft 18. At this time, the torque distribution is performed according to the basic torque distribution ratio determined from gear specifications of the planetary gear set. Further, when a rotational difference occurs between the front and rear wheels, the rotational difference is absorbed by the rotation and revolution of the first and second pinions 110 and 111.

Further, a differential limiting mechanism 114 constituted by a multiple disc clutch is provided between the output shaft 41 and the rear drive shaft 18 so as to generate a clutch torque $T_C$ based on signals of the front wheel rotation number $N_F$, the rear wheel rotation number $N_R$ and the steering angle ψ.

Further, by generating the clutch torque $T_C$ according to running conditions in the differential limiting mechanism 114 it is possible to change the torque distribution ratio between the front and rear wheels over a range from the basic torque distribution ratio determined from the gear specifications of the planetary gear set to the torque distribution ratio according to the four wheel drive running with direct drive. Further, since the differential limiting torque of the differential limiting mechanism 114 can be reduced according to the steering angle ψ, tight cornering brake phenomena can be prevented by reducing or minimizing the clutch torque.

Figure 19:
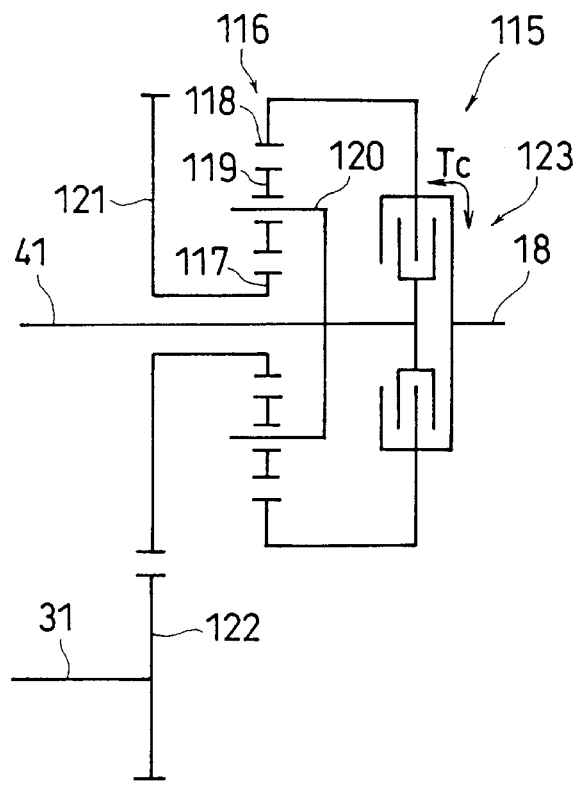
FIG. 19 is a schematic view for explaining a torque transmission of a driving force distributing apparatus according to a seventh embodiment of the present invention.

FIG. 19 shows a driving force distributing apparatus 115 according to a seventh embodiment of the present invention. The output shaft 41 of the transmission gearing mechanism 40 is rotatably arranged around the same axis as the rear drive shaft 18. The driving force distributing apparatus 115 comprises a differential mechanism 116 and a differential limiting mechanism 123. The differential mechanism 116 is constituted by a single row type planetary gears which includes a sun gear 117 rotatably fitted to the out put shaft 41, a ring gear 118, a pinion 119 meshing with the sun gear 117 and the ring gear respectively and a carrier 120 rotatably supporting the pinion 119. The carrier 120 is connected with the output shaft 41 and the driving force is outputted from the ring gear 118 to the rear drive shaft 18.

On the other hand, the sun gear 117 is connected with the transfer drive gear 121 which is rotatably supported by the output shaft 41. The transfer drive gear 121 meshes with the transfer driven gear 122 connected to the rear end of the front drive shaft 31 which is arranged below the output shaft 41 in parallel.

The driving force inputted from the output shaft 41 to the carrier 120 is distributed partly to the rear drive shaft 18 through the ring gear 118 and partly to the front drive shaft 121 through the sun gear 117, the transfer drive gear 121 and the transfer driven gear 122, respectively with the basic torque distribution ratio determined from the gear specifications of the sun gear 117 and the ring gear 118. Further, when a rotational difference occurs between the front and rear wheels, the rotational difference is absorbed by the rotation and revolution of the ring gear 118 and the sun gear 117.

Further, a differential limiting mechanism 123 constituted by a multiple disc clutch is provided between the output shaft 41 and the rear drive shaft 18 so as to generate a clutch torque $T_C$ based on signals of the front wheel rotation number $N_F$, the rear wheel rotation number $N_R$ and the steering angle $\psi$.

Therefore, by generating the clutch torque $T_C$ according to running conditions in the differential limiting mechanism 123 it is possible to change the torque distribution ratio between the front and rear wheels over a range from the basic torque distribution ratio determined from the gear specifications of the planetary gear set to the torque distribution ratio according to the four wheel drive running with direct drive. Further, since the differential limiting torque of the differential limiting mechanism 114 is reduced according to the steering angle $\psi$, tight-cornering brake phenomena can be prevented by reducing or minimizing the clutch torque.

Figure 20:
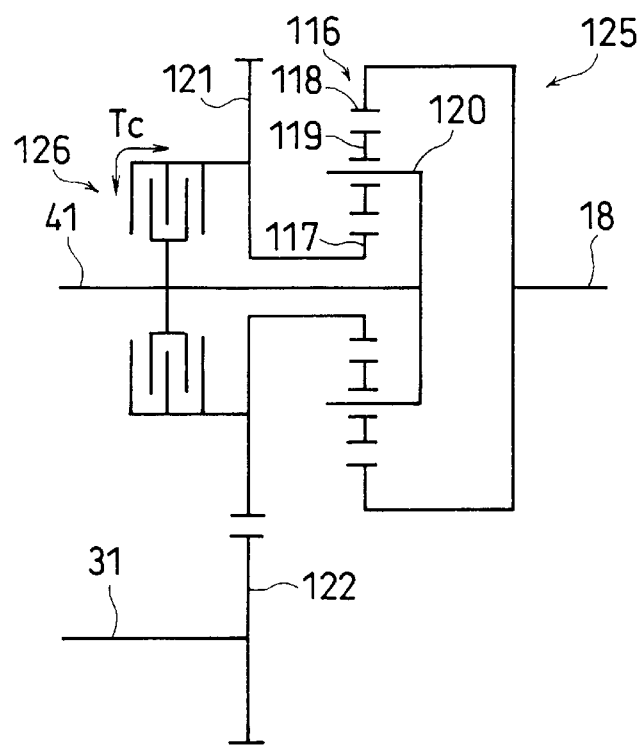
FIG. 20 is a schematic view for explaining a torque transmission of a driving force distributing apparatus according to a eighth embodiment of the present invention.

FIG. 20 shows a driving force distributing apparatus 125 according to an eighth embodiment of the present invention. The driving force distributing apparatus 125 according to this embodiment has a differential mechanism 116 constituted similarly to the seventh embodiment as shown in FIG. 19. Further, a differential limiting mechanism 126 constituted by a multiple disc clutch is provided between the output shaft 41 and the sun gear 117 in place of the differential limiting mechanism 123 provided between the output shaft 41 and the rear drive shaft 18. The differential limiting mechanism 126 generates a clutch torque $T_C$ based on signals of the front wheel rotation number $N_F$, the rear wheel rotation number $N_R$ and the steering angle $\psi$.

Therefore, by generating the clutch torque $T_C$ according to running conditions in the differential limiting mechanism 126 it is possible to change the torque distribution ratio between the front and rear wheels over a range from the basic torque distribution ratio determined from the gear specifications of the planetary gear set to the torque distribution ratio according to the four wheel drive running with direct drive. Further, since the differential limiting torque of the differential limiting mechanism 114 can be reduced according to the steering angle $\psi$, tight-cornering brake phenomena can be prevented by reducing or minimizing the clutch torque.

Figure 21:
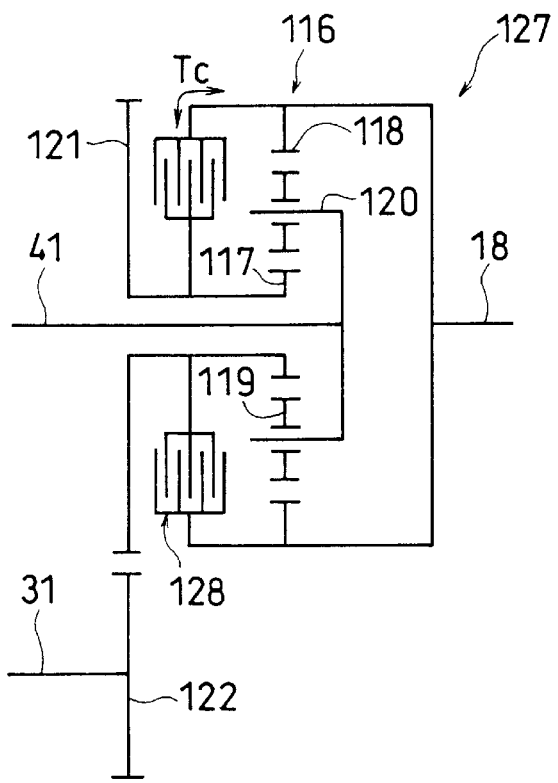
FIG. 21 is a schematic view for explaining a torque transmission of a driving force distributing apparatus according to a ninth embodiment of the present invention.

FIG. 21 shows a driving force distributing apparatus 127 according to a ninth embodiment of the present invention. The driving force distributing apparatus 127 according to this embodiment has a differential mechanism 116 constituted similarly to the seventh embodiment as shown in FIG. 19. Further, a differential limiting mechanism 128 constituted by a multiple disc clutch is provided between the ring gear 118 and the sun gear 117. The differential limiting mechanism 128 generates a clutch torque $T_C$ based on signals of the front wheel rotation number $N_F$, the rear wheel rotation number $N_R$ and the steering angle $\psi$.

Further, by generating the clutch torque $T_C$ according to running conditions in the differential limiting mechanism 128 it is possible to change the torque distribution ratio between the front and rear wheels over a range from the basic torque distribution ratio determined from the gear specifications of the planetary gear set to the torque distribution ratio according to the four wheel drive running with direct drive. Further, since the differential limiting torque of the differential limiting mechanism 114 can be reduced according to the steering angle $\psi$, tight-cornering brake phenomena can be prevented by reducing or minimizing the clutch torque.

Figure 22:
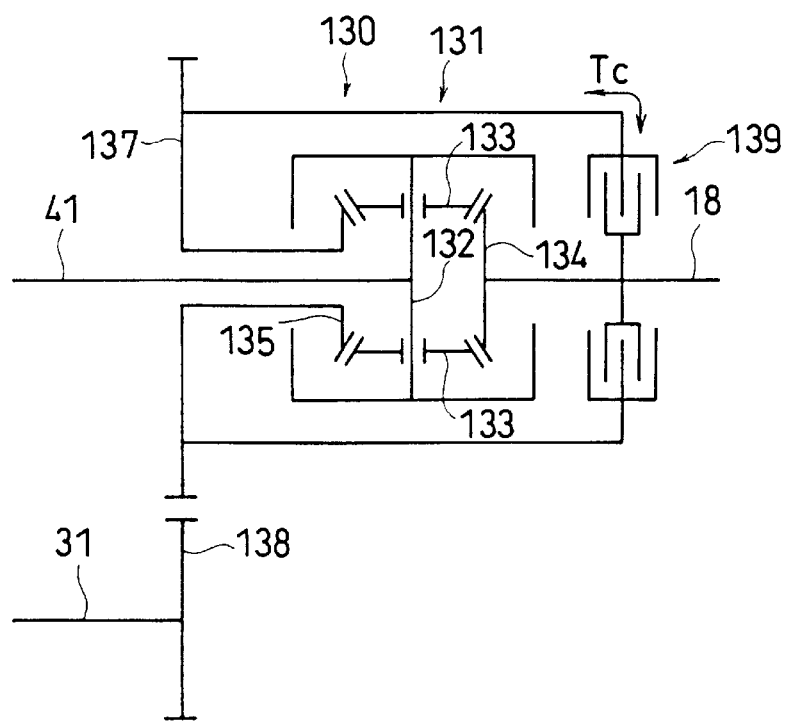
FIG. 22 is a schematic view for explaining a torque transmission of a driving force distributing apparatus according to a tenth embodiment of the present invention.

FIG. 22 shows a driving force distributing apparatus 130 according to a tenth embodiment of the present invention. The output shaft 41 of the transmission gearing mechanism 40 is rotatably arranged around the same axis as the rear drive shaft 18 and the driving force distributing apparatus 130 comprises a differential mechanism 131 and a differential limiting mechanism 139. The differential mechanism 131 is composed of bevel gears and it is provided between the output shaft 41 and the rear drive shaft 18.

The differential mechanism 131 comprises a pinion shaft 132 connected with the output shaft 41, a pair of pinion gears 133, a side gear 134 connected with the rear drive shaft 18 and meshing with both pinion gears 133 respectively and another side gear 135 connected with a transfer drive gear 137. The transfer drive gear 137 is rotatably mounted on the output shaft 41 and meshes with a transfer driven gear 138 connected with the rear end of the front drive shaft 31.

In the differential mechanism 131 thus constituted, the driving force inputted from the output shaft 41 to the pinion shaft 132 is distributed at an approximately equal basic torque distribution ratio. That is, the driving force inputted to the pinion shaft 132 is transferred partly to the rear wheel through the side gear 134 and the rear drive shaft 18 and partly to the front wheel through the other side gear 135, the transfer drive gear 137, the transfer driven gear 138 and the front drive shaft 31. Therefore, when a rotational difference occurs between both side gears 134 and 134, namely between the front and rear wheels, the rotational difference is absorbed by the revolution of the paired pinion gears 133.

Further, there is provided with a differential limiting mechanism 139 constituted by a multiple disc clutch between the transfer drive gear 137 and the rear drive shaft 18 so as to generate a clutch torque $T_C$ based on signals of the front wheel rotation number $N_F$, the rear wheel rotation number $N_R$ and the steering angle $\psi$.

Therefore, the torque distribution between both side gears 134 and 135 is limited by generating the clutch torque $T_C$ according to running conditions in the differential limiting mechanism 139. Further, since the differential limiting torque of the differential limiting mechanism 139 is reduced according to the steering angle $\psi$, the rotational difference between the front and rear wheels can be absorbed by reducing or minimizing the differential limiting torque, thereby tight cornering brake phenomena can be prevented.

Figure 23:
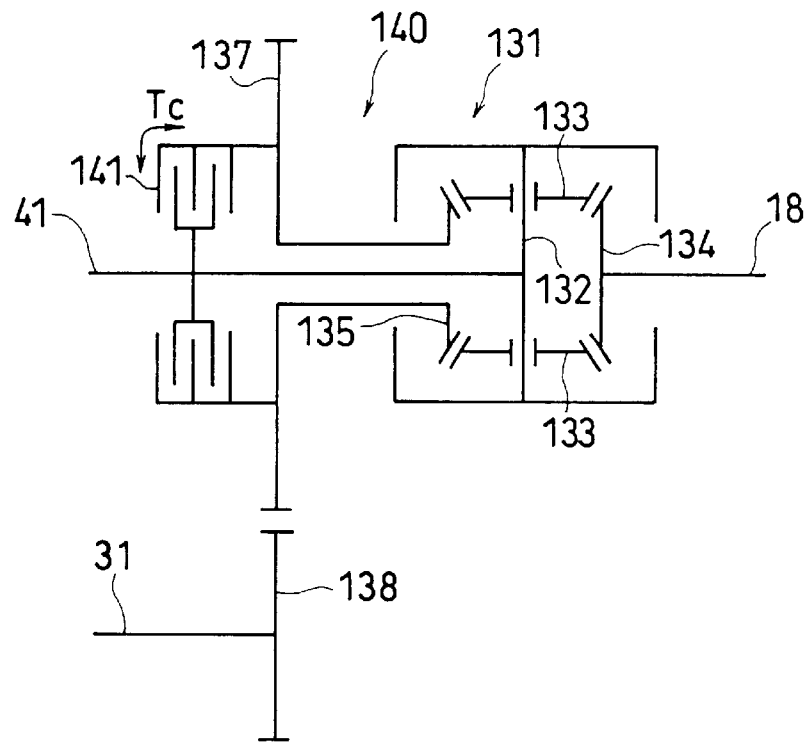
FIG. 23 is a schematic view for explaining a torque transmission of a driving force distributing apparatus according to an eleventh embodiment of the present invention.

FIG. 23 shows a driving force distributing apparatus 140 according to an eleventh embodiment of the present invention. The differential mechanism 131 is composed of the same components as that of the driving force distributing apparatus 130 according to the tenth embodiment.

In this eleventh embodiment, there is provided with a differential limiting mechanism 141 constituted by a multiple disc clutch between the output shaft 41 and the side gear 135 so as to generate a clutch torque $T_C$ according to vehicle running conditions based on signals of the front wheel rotation number $N_F$, the rear wheel rotation number $N_R$ and the steering angle $\psi$.

Further, the torque distribution between the output shaft 41 and the side gear 135 is limited by generating the clutch torque $T_C$ according to running conditions in the differential limiting mechanism 141. Further, since the differential limiting torque of the differential limiting mechanism 141 is reduced according to the steering angle $\psi$, the rotational difference between the front and rear wheels can be absorbed by reducing or minimizing the differential limiting torque, thereby tight cornering brake phenomena can be prevented.

Figure 24:
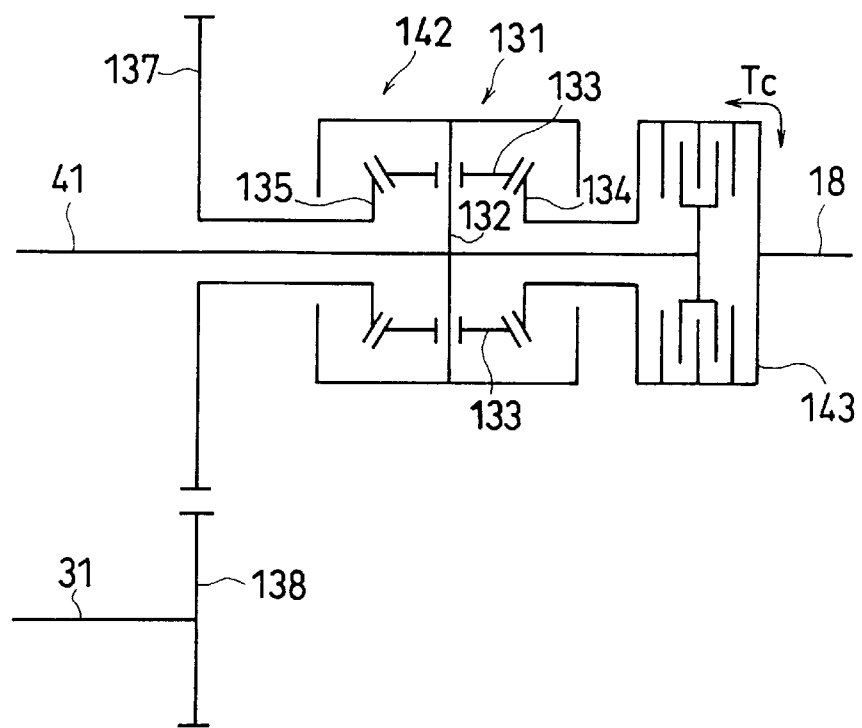
FIG. 24 is a schematic view for explaining a torque transmission of a driving force distributing apparatus according to a twelfth embodiment of the present invention.
Figure 25:
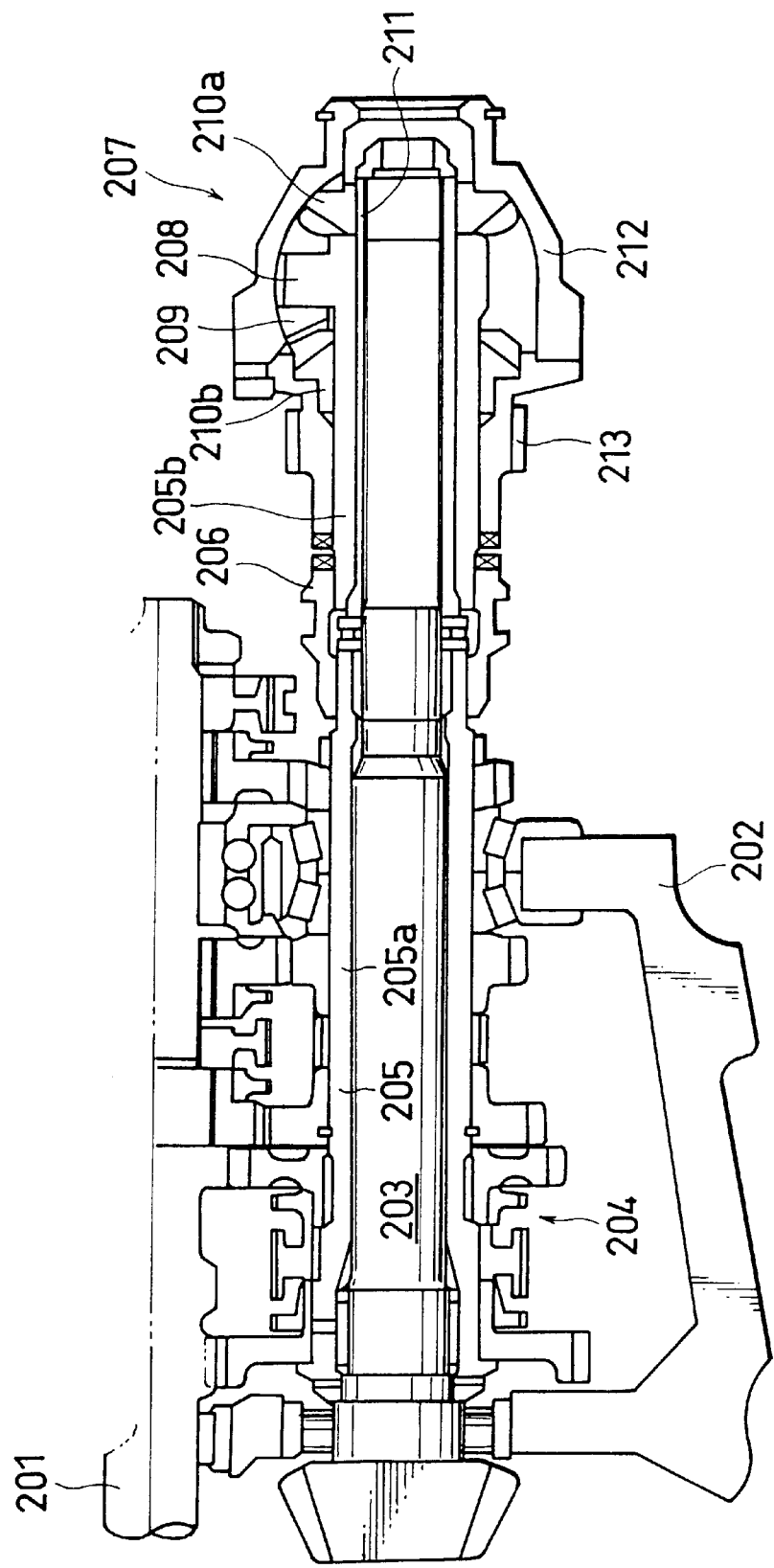
FIG. 25 is a partially sectional view showing a manual transmission for a four wheel drive vehicle according to a prior art.
Figure 25:
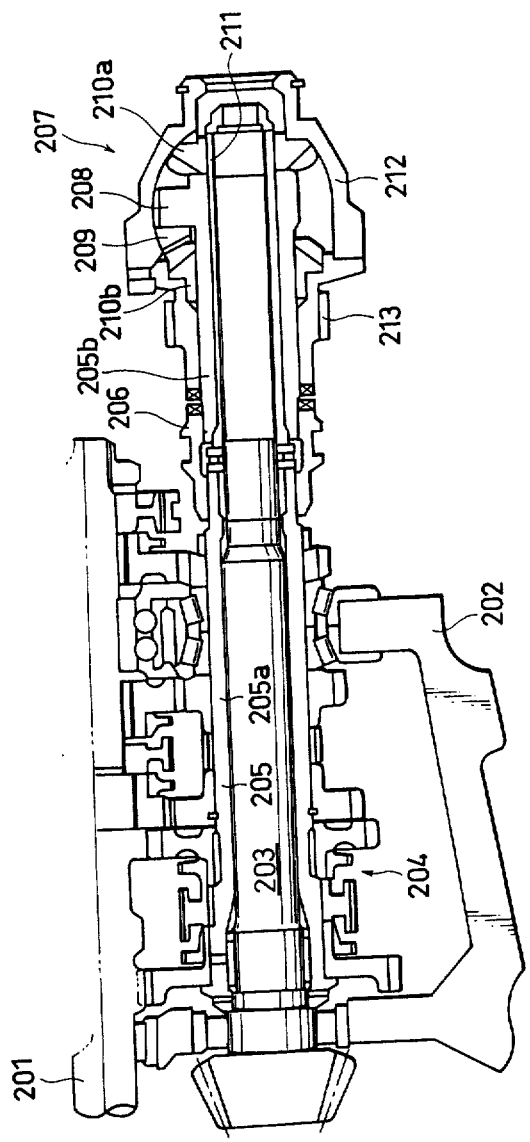

FIG. 24 shows a driving force distributing apparatus 140 according to a twelfth embodiment of the present invention. The differential mechanism 131 is composed of the same components as that of the driving force distributing apparatus 130 according to the tenth embodiment.

In this embodiment, there is provided with a differential limiting mechanism 143 constituted by a multiple disc clutch between the output shaft 41 and the rear drive shaft 18 so as to generate a clutch torque $T_C$ according to vehicle running conditions based on signals of the front wheel rotation number $N_F$, the rear wheel rotation number $N_R$ and the steering angle $\psi$.

Therefore, the torque distribution between the output shaft 41 and the rear drive gear 18 is limited by generating the clutch torque $T_C$ according to running conditions in the differential limiting mechanism 143. Further, since the differential limiting torque of the differential limiting mechanism 143 is reduced according to the steering angle $\psi$, the rotational difference between the front and rear wheels can be absorbed by reducing or minimizing the differential limiting torque, thereby tight cornering brake phenomena can be prevented.

Various examples have been described hereinbefore on vehicles in which the engine and manual transmission are arranged in the front side thereof, however these examples may be applied to vehicles in which the engine and transmission are mounted on the rear side thereof. Further, aforementioned examples of the differential limiting mechanism is composed of a multiple disc clutch but these may use other types of torque distribution apparatuses such as a viscous coupling. Further, other clutch means for example a dog clutch may be employed for the differential limiting mechanism.

According to the manual transmission for a four wheel drive vehicle, since the input shaft from the engine, the output shaft, the driving force distributing apparatus and the rear drive shaft are arranged on a common axis and further since the counter shaft is arranged below the output shaft in parallel, the driving force distributing apparatus can be located in a relatively high position. As a result, the driving force distributing apparatus has a small stirring resistance of oil, thereby power transmission efficiency and fuel economy can be improved. Further, since the driving force distributing apparatus is located in a high position, a space for accommodating components such as supporting members, an exhaust stem and the like can be obtained under the driving force distributing apparatus.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. A manual transmission of a four wheel drive vehicle for changing driving force of an engine and for distributing said driving force into a first drive shaft and a second drive shaft, said first drive shaft connected with a first wheel through a first differential and said second drive shaft connected with a second wheel through a propeller shaft and a second differential, comprising:

an input shaft for inputting driving force of said engine;

an input drive gear connected with said input shaft;

a hollow-shaped counter shaft arranged in parallel with said input shaft;

a counter driven gear connected with said counter shaft and meshing with said output drive gear;

a plurality of transmission drive gears connected with said counter shaft;

an output shaft arranged in parallel with said counter shaft on the same axis as said input shaft for outputting driving force of said transmission;

a plurality of transmission driven gears rotatably mounted on said output shaft and meshing with said corresponding transmission drive gears;

a plurality of synchronizing mechanisms spline-fitted to said output shaft for selectively engaging said transmission driven gears with said output shaft; and a driving force distributing means provided on the same axis as said output shaft for inputting driving force of said manual transmission and for distributing driving force of said manual transmission into said first drive shaft and said second drive shaft.

2. The manual transmission according to claim 1, wherein said first drive shaft is rotatably inserted to said hollow-shaped counter shaft sharing a common axis.

3. The manual transmission according to claim 1, wherein said second drive shaft is arranged on the same axis as said output shaft.

4. The manual transmission according to claim 1, further comprising:

an oil passage provided in a clearance formed between said hollow-shaped counter shaft and said first drive shaft.

5. The manual transmission according to claim 1, further comprising:

an oil hole longitudinally provided in said first drive shaft with one end thereof open to said first differential and with the other end thereof open to the outer periphery of said first drive shaft so as to supply lubrication oil to said oil passage.

6. The manual transmission according to claim 1, further comprising:

at least one oil supply hole provided across the inner periphery and the outer periphery of said counter shaft so as to supply lubrication oil to said drive and driven transmission gears.

7. The manual transmission according to claim 1, wherein said driving force distributing means comprises a differential mechanism including a transfer drive gear rotatably mounted on said output shaft, a transfer driven gear connected with said first drive shaft and meshing with said transfer drive gear, a first sun gear connected with said output shaft, a second sun gear rotatably arranged on the same axis as said output shaft and connected with said second drive shaft, a carrier connected with said transfer drive gear, a first pinion rotatably mounted on said carrier and meshing with said first sun gear, a second pinion integrally formed with said first pinion and meshing with said second sun gear for distributing driving force into said first and second drive shafts at a specified torque distribution ratio, and a differential limiting mechanism connecting said carrier and said second drive shaft for varying said specified torque distribution ratio.

8. The manual transmission according to claim 1, wherein said driving force distributing means comprises a transfer drive gear connected with said output shaft, a transfer driven gear connected with said first drive shaft and meshing with said transfer drive gear, and a differential limiting mechanism connecting said output shaft and said second drive shaft for varying a transfer torque between said first and second drive shafts.

9. The manual transmission according to claim 1, wherein
said driving force distributing means comprises a transfer drive gear rotatably mounted on said output shaft, a transfer driven gear connected with said first drive shaft and meshing with said transfer drive gear, and a differential limiting mechanism connecting said transfer drive gear and said second drive shaft connected with said output shaft for varying a transfer torque between said first and second drive shafts.

10. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a first sun gear connected with said output shaft, a second sun gear rotatably mounted on said output shaft and connected with said transfer drive gear, a carrier connected with said second drive shaft, a first pinion rotatably mounted on said carrier and meshing with said first sun gear, a second pinion integrally formed with said first pinion and meshing with said second sun gear for distributing driving force into said first and second drive shafts at a specified torque distribution ratio, and a differential limiting mechanism connecting said output shaft and said second drive shaft for varying said specified torque distribution ratio.

11. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a first sun gear connected with said output shaft, a second sun gear connected with said second drive shaft, a carrier connected with said transfer drive gear, a first pinion rotatably mounted on said carrier and meshing with said first sun gear, a second pinion integrally formed with said first pinion and meshing with said second sun gear for distributing driving force into said first and second drive shafts at a specified torque distribution ratio, and a differential limiting mechanism connecting said output shaft and said transfer drive gear for varying said specified torque distribution ratio.

12. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a first sun gear connected with said output shaft, a second sun gear rotatably mounted on said output shaft and connected with said second drive shaft, a carrier connected with said transfer drive gear, a first pinion rotatably mounted on said carrier and meshing with said first sun gear, a second pinion integrally formed with said first pinion and meshing with said second sun gear for distributing driving force into said first and second drive shafts at a specified torque distribution ratio, and a differential limiting mechanism connecting said output shaft and said second drive shaft for varying said specified torque distribution ratio.

13. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a sun gear rotatably mounted on said output shaft and connected with said transfer drive gear, a carrier connected with said output shaft, a planetary gear rotatably mounted on said carrier and meshing with said sun gear, a ring gear connected with said second drive shaft and meshing with said planetary gear for distributing driving force into said first and second drive shafts at a specified torque distribution ratio, and a differential limiting mechanism connecting said output shaft and said second drive shaft for varying said specified torque distribution ratio.

14. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a sun gear rotatably mounted on said output shaft and connected with said transfer drive gear, a carrier connected with said output shaft, a planetary gear rotatably mounted on said carrier and meshing with said sun gear, a ring gear connected with said second drive shaft and meshing with said planetary gear for distributing driving force into said first and second drive shafts at a specified torque distribution ratio, and a differential limiting mechanism connecting said output shaft and said transfer drive shaft for varying said specified torque distribution ratio.

15. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a sun gear rotatably mounted on said output shaft and connected with said transfer drive gear, a carrier connected with said output shaft, a planetary gear rotatably mounted on said carrier and meshing with said sun gear, a ring gear connected with said second drive shaft and meshing with said planetary gear for distributing driving force into said first and second drive shafts at a specified torque distribution ratio, and a differential limiting mechanism connecting said transfer drive gear and said second drive shaft for varying said specified torque distribution ratio.

16. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a first side gear connected with said transfer drive gear and rotatably mounted on said output shaft, at least one pinion shaft orthogonally connected with said output shaft, at least one pair of pinions rotatably mounted on said pinion shaft and meshing with said pinions, a second side gear connected with said second drive shaft and meshing with said pinions for distributing driving force into said first and second drive shafts at a specified torque distribution ratio, a differential limiting mechanism connecting said transfer drive gear and said second drive gear for varying said specified torque distribution ratio.

17. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a first side gear connected with said transfer drive gear and rotatably mounted on said output shaft, at least one pinion shaft orthogonally connected with said output shaft, at least one pair of pinions rotatably mounted on said pinion shaft and meshing with said pinions, a second side gear connected with said second drive shaft and meshing with said pinions for distributing driving force into said first and second drive shafts at a specified torque distribution ratio, a differential limiting mechanism connecting said transfer drive gear and said output shaft for varying said specified torque distribution ratio.

18. The manual transmission according to claim 1, wherein
said driving force distributing means comprises a differential mechanism including a transfer drive gear rotatably mounted on said output shaft, a transfer driven gear connected with said first drive shaft and meshing with said transfer drive gear, a first side gear connected with said transfer drive gear and rotatably mounted on said output shaft, at least one pinion shaft orthogonally connected with said output shaft, at least one pair of pinions rotatably mounted on said pinion shaft and meshing with said pinions, a second side gear connected with said second drive shaft and meshing with said pinions for distributing driving force into said first and second drive shafts at a specified torque distribution ratio for distributing driving force into said first and second drive shafts at a specified torque distribution ratio, a differential limiting mechanism connecting said output shaft and said second drive shaft for varying said specified torque distribution ratio.

19. The manual transmission according to claim 7, wherein
said differential limiting mechanism has a capability of varying said specified torque distribution ratio according to running conditions.

20. The manual transmission according to claim 19, wherein
said running conditions include at least a slip rate and a steering angle.

21. The manual transmission according to claim 7, wherein
said differential limiting mechanism has a capability of varying according to a difference of rotation speed between input and output elements.

22. The manual transmission according to claim 7, wherein
said differential limiting mechanism is a clutch for engaging or disengaging a connection between input and output elements by manual operation.

23. The manual transmission according to claim 8, wherein
said differential limiting mechanism has a capability of varying said transfer torque according to running conditions.

24. The manual transmission according to claim 23, wherein
said running conditions include at least a slip rate and a steering angle.

25. The manual transmission according to claim 9, wherein
said differential limiting mechanism has a capability of varying said transfer torque according to running conditions.

26. The manual transmission according to claim 25, wherein
said running conditions include at least a slip rate and a steering angle.

27. The manual transmission according to claim 10, wherein
said differential limiting mechanism has a capability of varying said specified torque distribution ratio according to running conditions.

28. The manual transmission according to claim 27, wherein
said running conditions include at least a slip rate and a steering angle.

29. The manual transmission according to claim 10, wherein
said differential limiting mechanism has a capability of varying torque transferred according to a difference of rotation speed between input and output elements.

30. The manual transmission according to claim 10, wherein
said differential limiting mechanism is a clutch for engaging or disengaging a connection between input and output elements by manual operation.

31. The manual transmission according to claim 11, wherein
said differential limiting mechanism has a capability of varying said specified torque distribution ratio according to running conditions.

32. The manual transmission according to claim 31, wherein
said running conditions include at least a slip rate and a steering angle.

33. The manual transmission according to claim 11, wherein
said differential limiting mechanism has a capability of varying said specified torque distribution ratio according to a difference of rotation speed between input and output elements.

34. The manual transmission according to claim 11, wherein
said differential limiting mechanism is a clutch for engaging or disengaging a connection between input and output elements by manual operation.

35. The manual transmission according to claim 12, wherein
said differential limiting mechanism has a capability of varying said specified torque distribution ratio according to running conditions.

36. The manual transmission according to claim 35, wherein
said running conditions include at least a slip rate and a steering angle.

37. The manual transmission according to claim 12, wherein
said differential limiting mechanism has a capability of varying said specified torque distribution ratio according to a difference of rotation speed between input and output elements.

38. The manual transmission according to claim 12, wherein said differential limiting mechanism is a clutch for engaging or disengaging a connection between input and output elements by manual operation.

39. The manual transmission according to claim 13, wherein
said differential limiting mechanism has a capability of varying said specified torque distribution ratio according to running conditions.

40. The manual transmission according to claim 39, wherein
said running conditions include at least a slip rate and a steering angle.

41. The manual transmission according to claim 13, wherein
said differential limiting mechanism has a capability of varying said specified torque distribution ratio according to a difference of rotation speed between input and output elements.

42. The manual transmission according to claim 13, wherein
said differential limiting mechanism is a clutch for engaging or disengaging a connection between input and output elements by manual operation.

43. The manual transmission according to claim 14, wherein
said differential limiting mechanism has a capability of varying said specified torque distribution ratio according to running conditions.

44. The manual transmission according to claim 43, wherein
said running conditions include at least a slip rate and a steering angle.

45. The manual transmission according to claim 14, wherein
said differential limiting mechanism has a capability of varying said specified torque distribution ratio according to a difference of rotation speed between input and output elements.

46. The manual transmission according to claim 14, wherein
said differential limiting mechanism is a clutch for engaging or disengaging a connection between input and output elements by manual operation.

47. The manual transmission according to claim 15, wherein
said differential limiting mechanism has a capability of varying said specified torque distribution ratio according to running conditions.

48. The manual transmission according to claim 47, wherein
said running conditions include at least a slip rate and a steering angle.

49. The manual transmission according to claim 15, wherein
said differential limiting mechanism has a capability of varying said specified torque distribution ratio according to a difference of rotation speed between input and output elements.

50. The manual transmission according to claim 15, wherein
said differential limiting mechanism is a clutch for engaging or disengaging a connection between input and output elements by manual operation.

51. The manual transmission according to claim 16, wherein
said differential limiting mechanism has a capability of varying said specified torque distribution ratio according to running conditions.

52. The manual transmission according to claim 51, wherein
said running conditions include at least a slip rate and a steering angle.

53. The manual transmission according to claim 16, wherein
said differential limiting mechanism has a capability of varying said specified torque distribution ratio according to a difference of rotation speed between input and output elements.

54. The manual transmission according to claim 16, wherein
said differential limiting mechanism is a clutch for engaging or disengaging a connection between input and output elements by manual operation.

55. The manual transmission according to claim 17, wherein
said differential limiting mechanism has a capability of varying said specified torque distribution ratio according to running conditions.

56. The manual transmission according to claim 55, wherein
said running conditions include at least a slip rate and a steering angle.

57. The manual transmission according to claim 17, wherein
said differential limiting mechanism has a capability of varying said specified torque distribution ratio according to a difference of rotation speed between input and output elements.

58. The manual transmission according to claim 17, wherein
said differential limiting mechanism is a clutch for engaging or disengaging a connection between input and output elements by manual operation.

59. The manual transmission according to claim 18, wherein
said differential limiting mechanism has a capability of varying said specified torque distribution ratio according to running conditions.

60. The manual transmission according to claim 59, wherein
said running conditions include at least a slip rate and a steering angle.

61. The manual transmission according to claim 18, wherein
said differential limiting mechanism has a capability of varying said specified torque distribution ratio according to a difference of rotation speed between input and output elements.

62. The manual transmission according to claim 18, wherein
said differential limiting mechanism is a clutch for engaging or disengaging a connection between input and output elements by manual operation.

* * * * *

UNITED STATES PATENT AND TRADEMARK OFFICE
CERTIFICATE OF CORRECTION

PATENT NO. : 5,906,557
DATED : May 25, 1999
INVENTOR(S) : Toshio Kobayashi

Page 1 of 2

It is certified that error appears in the above-identified patent and that said Letters Patent is hereby corrected as shown below:

IN THE DRAWING, FIGURE 25 SHOULD BE IDENTIFIED BY THE LEGEND:

"PRIOR ART".

Signed and Sealed this

Twenty-ninth Day of May, 2001

Attest:

NICHOLAS P. GODICI

Attesting Officer

Acting Director of the United States Patent and Trademark Office